United States Patent
Khare et al.

(10) Patent No.: US 11,449,880 B2
(45) Date of Patent: Sep. 20, 2022

(54) METHODS, SYSTEMS, APPARATUS AND ARTICLES OF MANUFACTURE TO MODEL ECOMMERCE SALES

(71) Applicant: Nielsen Consumer LLC, Chicago, IL (US)

(72) Inventors: Ravish Khare, Mumbai (IN); Prayag Bhatia, Mumbai (IN)

(73) Assignee: Nielsen Consumer LLC, Chicago, IL (US)

( * ) Notice: Subject to any disclaimer, the term of this patent is extended or adjusted under 35 U.S.C. 154(b) by 0 days.

(21) Appl. No.: 16/230,069

(22) Filed: Dec. 21, 2018

(65) Prior Publication Data

US 2020/0143391 A1  May 7, 2020

Related U.S. Application Data

(60) Provisional application No. 62/754,368, filed on Nov. 1, 2018.

(51) Int. Cl.
| | |
|---|---|
| *G06Q 30/02* | (2012.01) |
| *G06N 20/00* | (2019.01) |
| *G06F 40/30* | (2020.01) |

(52) U.S. Cl.
CPC ........ *G06Q 30/0201* (2013.01); *G06F 40/30* (2020.01); *G06N 20/00* (2019.01); *G06Q 30/0202* (2013.01)

(58) Field of Classification Search
CPC .......... G06Q 30/0201; G06Q 30/0202; G06Q 30/0631; G06Q 30/00; G06N 20/00; G06F 40/30
See application file for complete search history.

(56) References Cited

U.S. PATENT DOCUMENTS

| | | | |
|---|---|---|---|
| 5,974,396 A | 10/1999 | Anderson et al. | |
| 7,698,171 B2 * | 4/2010 | Rampell | G06Q 30/08 705/26.3 |

(Continued)

FOREIGN PATENT DOCUMENTS

WO    WO-2018124400 A1 *   7/2018   ............. G06F 17/18

OTHER PUBLICATIONS

Rygielski-Chris, Wang-JyunCheng, Yen-David, 2002, Data mining techniques for customer relationship management, Technology in Society, pp. 483-502 (Year: 2002).*

*Primary Examiner* — Rutao Wu
*Assistant Examiner* — Stephen S Swartz
(74) *Attorney, Agent, or Firm* — Hanley, Flight & Zimmerman, LLC

(57) ABSTRACT

Methods, apparatus, systems and articles of manufacture methods, systems, apparatus and articles of manufacture to model ecommerce sales are disclosed. A system to model to eCommerce sales includes a trend identifier to compute commerce metric differences corresponding to products, the commerce metric differences based on first commerce metrics scraped at a first time and second commerce metrics scraped at a second time, a splitter to split the commerce metric differences into a first portion of the commerce metric differences corresponding to a first dataset of eCommerce cooperators, and into a second portion of the commerce metric differences corresponding to a second dataset of eCommerce non-cooperators, a machine learning engine to infer sales data by estimating eCommerce non-cooperators sales based on the second portion of the commerce metric differences, and a sales allocator to estimate sales missing from collected sales data based on the estimate eCommerce non-cooperators sales.

21 Claims, 8 Drawing Sheets

(56) References Cited

U.S. PATENT DOCUMENTS

| | | | |
|---|---|---|---|
| 7,873,529 B2 | 1/2011 | Kruger et al. | |
| 8,027,866 B2 | 9/2011 | Kriss et al. | |
| 2001/0049690 A1* | 12/2001 | McConnell | G07G 1/0054 |
| 2005/0055275 A1* | 3/2005 | Newman | G06Q 30/0205 |
| | | | 705/14.41 |
| 2006/0242039 A1 | 10/2006 | Haggerty et al. | |
| 2007/0299743 A1* | 12/2007 | Staib | G06Q 30/0204 |
| | | | 705/7.33 |
| 2008/0262900 A1* | 10/2008 | Duffy | G06Q 30/0203 |
| | | | 705/7.32 |
| 2008/0313017 A1 | 12/2008 | Totten | |
| 2008/0319829 A1 | 12/2008 | Hunt et al. | |
| 2009/0292599 A1* | 11/2009 | Rampell | G06Q 30/0275 |
| | | | 705/14.13 |
| 2012/0303410 A1* | 11/2012 | Connors | G06Q 30/02 |
| | | | 705/7.31 |
| 2013/0024273 A1* | 1/2013 | Stark | G06Q 30/00 |
| | | | 705/14.43 |
| 2013/0080223 A1* | 3/2013 | Lavu | G06Q 20/349 |
| | | | 705/14.11 |
| 2014/0058763 A1* | 2/2014 | Zizzamia | G06Q 50/22 |
| | | | 705/4 |
| 2014/0081449 A1* | 3/2014 | Maskatia | G06Q 20/4012 |
| | | | 700/232 |
| 2014/0207560 A1* | 7/2014 | Dandekar | G06Q 30/0242 |
| | | | 705/14.41 |
| 2014/0278804 A1* | 9/2014 | Lanxner | G06Q 30/0206 |
| | | | 705/7.35 |
| 2014/0324537 A1* | 10/2014 | Gilbert | G06Q 30/0201 |
| | | | 705/7.31 |
| 2014/0379428 A1* | 12/2014 | Phansalkar | H04L 67/22 |
| | | | 705/7.32 |
| 2015/0106260 A1* | 4/2015 | Andrews | G06Q 20/4016 |
| | | | 705/39 |
| 2015/0371239 A1* | 12/2015 | Hoyne | G06Q 30/0201 |
| | | | 705/7.29 |
| 2016/0253710 A1* | 9/2016 | Publicover | H04N 21/4532 |
| | | | 705/14.66 |
| 2017/0236182 A1* | 8/2017 | Ignatyev | G06Q 30/0631 |
| | | | 705/26.7 |
| 2022/0036376 A1* | 2/2022 | Wichman | G06F 40/289 |
| 2022/0114640 A1* | 4/2022 | Pawar | G06Q 30/0631 |

* cited by examiner

METHODS, SYSTEMS, APPARATUS AND ARTICLES OF MANUFACTURE TO MODEL ECOMMERCE SALES

RELATED APPLICATION

This patent claims the benefit of U.S. Provisional Patent Application Ser. No. 62/754,368, entitled "Methods, Systems, Apparatus and Articles of Manufacture to Improve eCommerce Estimation Modeling," which was filed on Nov. 1, 2018. U.S. Provisional Patent Application Ser. No. 62/754,368 is hereby incorporated herein by reference in its entirety.

FIELD OF THE DISCLOSURE

This disclosure relates generally to eCommerce, and, more particularly, to methods, systems, apparatus and articles of manufacture to model eCommerce sales.

BACKGROUND

Increasing numbers of products are being purchased online from eCommerce entities (e.g., vendors, retailers, sellers, stores, etc.). An eCommerce entity does not have a conventional physical presence where a consumer can physically go to shop. Instead, for an eCommerce store, a consumer electronically interacts with an eCommerce website (e.g., over the Internet), application, etc. where the consumer can select products for purchase, pay for the selected products, and have the purchased products delivered to a location specified by the consumer. In some instances, an eCommerce entity may have an associated conventional brick-and-mortar store where a consumer can physically go to shop.

Figure 1:
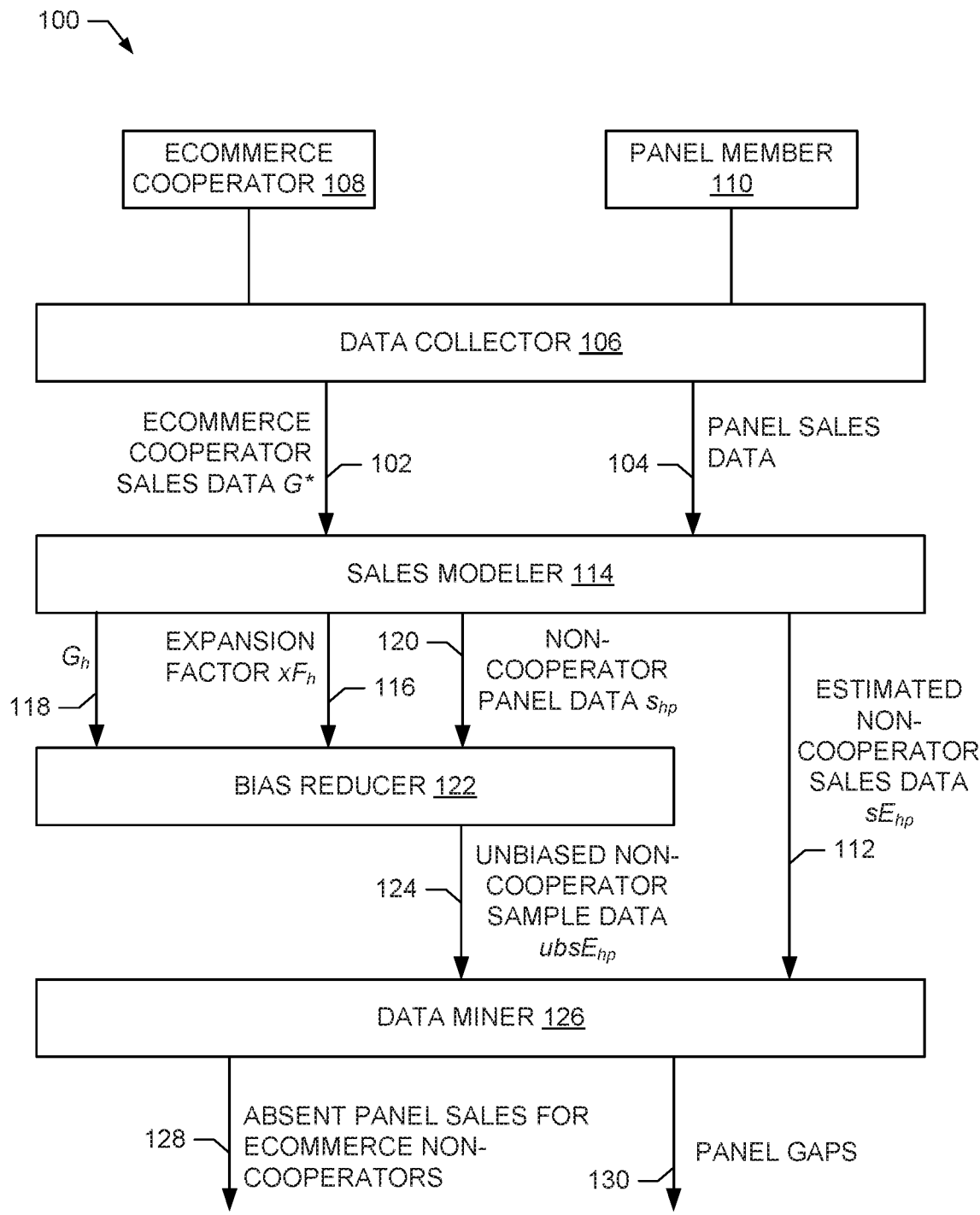
FIG. 1 illustrates an example system to estimate eCommerce sales constructed in accordance with teachings of this disclosure.

In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Commerce measurement entities measure, for example, the purchases of products, services, etc., and link such sales data with demographic information. An example commerce measurement entity is The Nielsen Company (US), LLC, the Applicant of the instant application. Commerce measurement entities can determine sales based on registered panel members. To that end, a commerce measurement entity enrolls people who consent to being monitored in a panel. Members of a panel are selected based on their demographics so that the panel is representative of a group of persons, a group of households, a geographic region, etc. The commerce measurement entity then monitors those panel members to determine sales by those panel members. Sales at physical stores where a person can go physically to shop (a.k.a. brick-and-mortar stores) can likewise be monitored for sales. While sales data can be obtained from some eCommerce entities (e.g., eCommerce cooperators, eCommerce participators, etc.), not all eCommerce entities are willing and able to provide sales data and demographic information. eCommerce cooperators are eCommerce entities that have agreed to provide sales data and demographic information, if available, for their sales to a commerce measurement entity. A commerce measurement entity can use panel member sales data, brick-and-mortar sales data, and eCommerce cooperators sales data to estimate sales data and demographic information for a group of persons, a group of households, a geographic region, demographic categories, etc. However, traditional eCommerce measurement techniques cannot incorporate sales data for eCommerce entities that do not provide sales data (e.g., an eCommerce non-cooperator, an eCommerce non-participator, etc.). In view of challenges associated with such traditional eCommerce measurement techniques, analyst discretion and/or guesswork is applied. However, such discretionary behavior, guesswork, and/or reliance on heuristics produces erroneous and/or otherwise bias results. Furthermore, panel sizes can result in an under-representation (e.g., partially, wholly, etc.) of recorded purchases from eCommerce cooperators and/or eCommerce non-cooperators. Thus, panel size can result in statistical biases in the composition of a panel and, thus, statistical biases in sales data recorded by the panel. Accordingly, traditional eCommerce sales estimates based on panels can fail to capture all aspects of eCommerce sales (e.g., all eCommerce entities, all products, etc.). Therefore, marketing, advertising, sales, etc. decisions made by manufacturers, advertisers, marketing entities, eCommerce entities, etc. based on recorded panel purchases can be incorrect, resulting in, for example, money spent to advertise products to the wrong groups of people.

To estimate more statistically accurate (e.g., less bias, less discretionary input (error), without relying on heuristics or guesswork, etc.) and more complete (e.g., representative, comprehensive, encompassing, etc.) sales data for eCommerce non-cooperators in a manner devoid of analyst discretion, guesswork and/or bias, some disclosed example commerce measurement entities obtain commerce metrics that represent information related to aspects of the sales of products. Example commerce metric include publicly available product information (e.g., consumer ratings, consumer comments, consumer questions, etc.) from eCommerce non-cooperators websites. In some examples, the publicly available product information is obtained using web scraping (e.g., web harvesting, web data extraction, etc.). Some disclosed example commerce measurement entities use the publicly available product information to infer (e.g., estimate, model, ascertain, project, etc.) sales for the eCommerce non-cooperators. Additionally, and/or alternatively, sales for eCommerce non-cooperators can be inferred (e.g., estimated, modeled, ascertained, projected, etc.) from panel member sales data and/or eCommerce cooperators sales data. Having thus determined sales for eCommerce non-cooperators, the eCommerce non-cooperators sales can be combined with eCommerce cooperators sales data to estimate total eCommerce sales. Additionally, and/or alternatively, in some examples, bias in sales estimates are removed in a manner devoid of analyst discretion, guesswork and/or bias. Therefore, the examples disclosed herein provide methods, systems, apparatus and articles of manufacture to model eCommerce sales that are more accurate, more statistically significant and more computationally efficient. Therefore, the example methods, systems, apparatus and articles of manufacture disclosed herein to model eCommerce sales are more computationally efficient than traditional methods by accurately providing unbiased sales estimates that reflect a full range of products and strata, without having to recruit, manage and pay for large numbers of panel members.

Reference will now be made in detail to non-limiting examples, some of which are illustrated in the accompanying drawings.

FIG. 1 illustrates an example system 100 to estimate eCommerce sales constructed in accordance with teachings of this disclosure. To collect eCommerce cooperators sales data G*102, and panel sales data 104, the example system 100 includes an example data collector 106. The example data collector 106 of FIG. 1 periodically and/or aperiodically obtains (e.g., collects, queries for, receives, prompts for, etc.) the eCommerce cooperators sales data G*102 from eCommerce cooperators (one of which is designated at reference numeral 108), and the panel sales data 104 from panel members (one of which is designated at reference numeral 110). In some examples, the eCommerce cooperators sales data G*102 and the panel sales data 104 are a list of purchased items including item details (e.g., description, category, etc.). In some examples, the data collector 106 scrapes eCommerce websites for commerce metrics.

To estimate eCommerce non-cooperators sales $sE_{hp}$ 112, the example system 100 includes an example sales modeler 114. The example sales modeler 114 of FIG. 1 estimates the eCommerce non-cooperators sales $sE_{hp}$ 112 from the eCommerce cooperators sales data G*102 and the panel sales data 104. For different strata h (e.g., city, region, class, age, income, etc.), the sales modeler 114 determines a respective expansion factor $xF_h$ 116 based on the number of eCommerce cooperators sales $G_h$ 118 recorded for the strata h, and the number of panel sales $g_h$ recorded for eCommerce cooperators recorded for the strata h. The sales modeler 114 estimates eCommerce non-cooperators sales $sE_{hp}$ 112 for a strata h and a product p (e.g., corresponding to a strata h and a product p) based on the expansion factor $xF_h$ 116, and panel sales $s_{hp}$ 120 for eCommerce non-cooperators recorded for the strata h and the productp. The expansion factor $xF_h$ 116 represents the amount by which panel sales data 104 for eCommerce cooperators would have to be increased to be the same amount of sales as the eCommerce cooperators sales data G*102. The expansion factor $xF_h$ 116 is subsequently used to increase panel sales $s_{hp}$ 120 for eCommerce non-cooperators to form an estimate of eCommerce non-cooperators sales $sE_{hp}$ 112, as described in further detail below in connection with FIGS. 2 and 3. In this example, the sales modeler 114 implements means for forming sales estimate. The means for forming sales estimate may additionally or alternatively be implemented by the processor 802 of FIG. 8.

While the panel sales data 104 is unbiased with respect to source of purchase, there may be an unintended statistical bias in a panel with respect to a much larger set of purchasers. To reduce (e.g., remove, reduce, etc.) any bias(es) present in the estimated eCommerce non-cooperators sales $sE_{hp}$ 112, the example system 100 includes an example bias reducer 122. The example bias reducer 122 of FIG. 1 determines weights $w_{hc}$ that represent discrepancies (e.g., differences, ratios, etc.) between unbiased proportions $ubCP_{hc}$ and potentially biased proportions $pcp_{hc}$. The unbiased proportions $ubCP_{hc}$ are proportions of a large set of entities c (e.g., persons households, etc.) based on different strata h. The unbiased proportions $ubCP_{hc}$ may be obtained from a large-scale survey, such as a readership survey, a census, etc. The potentially biased proportions $pcp_{hc}$ are proportions of a panel based on different strata h. The sales modeler 114 estimates unbiased eCommerce non-cooperators sales $ubsE_{hp}$ 124 for a strata h and a product p based on the expansion factor $xF_h$ 116, the weights $w_{hc}$, and the panel sales $s_{hip}$ 120 for eCommerce non-cooperators recorded for the strata h and the product p, as described in further detail below in connection with FIGS. 4 and 5. In this example, the bias reducer 122 implements means for reducing bias. The means for reducing bias may additionally or alternatively be implemented by the processor 802 of FIG. 8.

To use commerce metrics to infer (e.g., model, project, estimate, ascertain, etc.) sales data for eCommerce non-cooperators, the example system 100 includes an example data miner 126. Commerce metrics represent supplemental information related to aspects of the sales of products. Example commerce metric include publicly available product information (e.g., consumer ratings, consumer comments, consumer questions, etc.) from eCommerce non-cooperators websites. The example data miner 126 of FIG. 1 obtains the publicly available product information (e.g., ratings, feedback instances, comments, etc.) from eCommerce non-cooperators websites using web scraping (e.g., web harvesting, web data extraction, etc.). The data miner 126 computes a contribution probability index (CPI) for each product sold by an eCommerce entity on its website, and uses the CPI to identify and correct for absent panel sales 128 for eCommerce non-cooperators that were not captured in the panel sales data 104. The data miner 126 also uses the CPI and the estimated eCommerce non-cooperators sales $sE_{hp}$ 112 and/or the estimated unbiased eCommerce non-cooperators sales $ubsE_{hp}$ 124 to identify statistical panel gaps 130 (e.g., consumer class, strata, category, etc.) in the composition of a panel that are statistically underrepresented in the panel associated with the panel sales data 104, as described in further detail below in connection with FIGS. 6 and 7. In this example, the data miner 126 implements means for mining data. The means for mining data may additionally or alternatively be implemented by the processor 802 of FIG. 8.

While an example manner of implementing the system 100 is illustrated in FIG. 1, one or more of the elements, processes and/or devices illustrated in FIG. 1 may be combined, divided, re-arranged, omitted, eliminated and/or implemented in any other way. Further, the example data collector 106, the example sales modeler 114, the example bias reducer 122, the example data miner 126 and/or, more generally, the example system 100 of FIG. 1 may be implemented by hardware, software, firmware and/or any combination of hardware, software and/or firmware. Thus, for example, any of the example data collector 106, the example sales modeler 114, the example bias reducer 122, the example data miner 126 and/or, more generally, the example system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASICNT(s)), programmable logic device(s) (PLD(s)), field programmable gate array(s) (FPGA(s)), and/or field programmable logic device(s) (FPLD(s)). When reading any of the apparatus or system claims of this patent to cover a purely software and/or firmware implementation, at least one of the example data collector 106, the example sales modeler 114, the example bias reducer 122, the example data miner 126, and/or the example system 100 is/are hereby expressly defined to include a non-transitory computer-readable storage device or storage disk such as a memory, a digital versatile disk (DVD), a compact disc (CD), a compact disc read-only memory (CD-ROM), a Blu-ray disk, etc. including the software and/or firmware. Further still, the example system 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
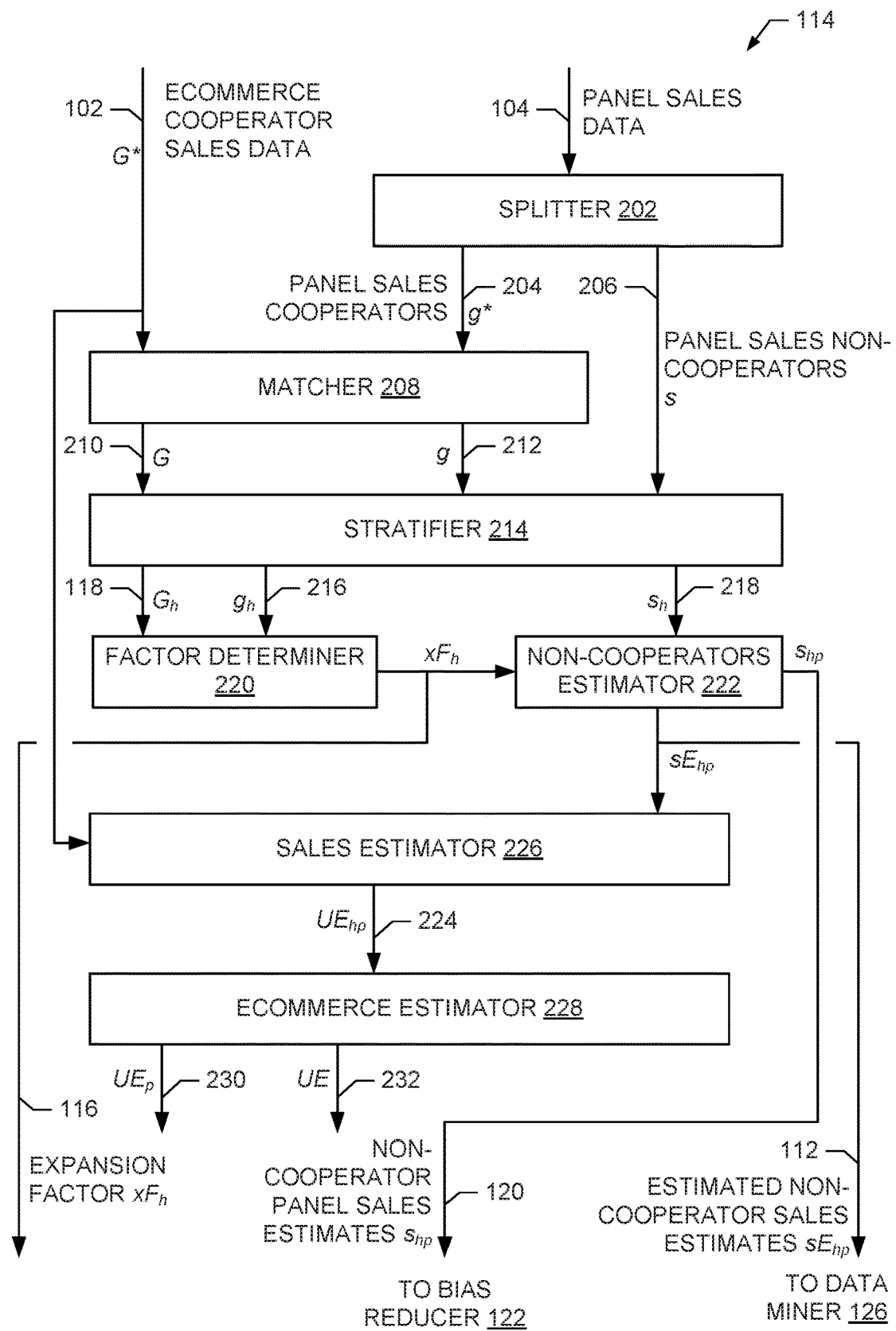
FIG. 2 is a block diagram illustrating an example implementation of the example sales modeler of FIG. 1.

FIG. 2 is a block diagram illustrating an example implementation of the sales modeler 114 of FIG. 1. To split sales data, the example sales modeler 114 of FIG. 2 includes an example splitter 202. The example splitter 202 of FIG. 2 splits the panel sales data 104 into panel sales data G*204 for eCommerce cooperators, and panel sales data s 206 for eCommerce non-cooperators. In this example, the splitter 202 implements second means for splitting. The means for splitting may additionally or alternatively be implemented by the processor 802 of FIG. 8.

To match sales data, the example sales modeler 114 of FIG. 2 includes an example matcher 208. The example matcher 208 of FIG. 2 matches (e.g., sorts, orders, rearranges, etc.) purchases of the eCommerce cooperators sales data G*102 based on product category (e.g., beauty, furniture, grocery, etc.) and/or by product to form matched eCommerce cooperators sales data G 210. The example matcher 208 likewise matches (e.g., sorts, orders, etc.) sales in the panel sales data G*204 for eCommerce cooperators based on product category (e.g., beauty, furniture, grocery, etc.) and/or by product to form matched panel sales data G 212 for eCommerce cooperators. In this example, the matcher 208 implements means for matching. The means for matching may additionally or alternatively be implemented by the processor 802 of FIG. 8.

To stratify sales data, the example sales modeler 114 includes an example stratifier 214. The example stratifier 214 of FIG. 2 splits the matched eCommerce cooperators sales data G 210 based on strata h to form stratified eCommerce cooperators sales data $G_h$ 118. Example strata h include, for example, city, region, socio-economic class, etc. The stratifier likewise splits the panel sales data G 212 for eCommerce cooperators into stratified panel sales data $g_h$ 216 for eCommerce cooperators, and splits the panel sales data s 206 for eCommerce non-cooperators into stratified panel sales data $s_h$ 218 for eCommerce non-cooperators. In this example, the stratifier 214 implements first means for stratifying. The first means for stratifying may additionally or alternatively be implemented by the processor 802 of FIG. 8.

To determine an expansion factor, the example sales modeler 114 includes an example factor determiner 220. The example factor determiner 220 of FIG. 2 determines the expansion factor $xF_h$ 116 that represents a ratio of the amount of eCommerce cooperators sales data $G_h$ 118 and panels sales data $g_h$ 216 for eCommerce cooperators for a strata h. The expansion factor $xF_h$ 116 can be computed by the example factor determiner 220 in a manner consistent with example mathematical expression of EQN (2A).

$$xF_h = CNT(G_h)/CNT(g_h) \qquad \text{EQN (2A)}$$

CNT(x) is a count of the number of entries in x. For example, $g_h$ contains an entry for each product purchase in the strata h and, thus, $CNT(g_h)$ is the number of products purchased in the strata h. In this example, the factor determiner 220 implements means for determining factors. The means for determining factors may additionally or alternatively be implemented by the processor 802 of FIG. 8.

To estimate eCommerce non-cooperators sales $sE_{hp}$ 112, the example sales modeler 114 includes an example non-cooperators estimator 222. In some examples, the example non-cooperators estimator 222 of FIG. 2 performs quality checks and/or outlier management for each product p and strata h. For example, non-cooperators estimator 222 checks for and corrects the panel sales data $s_h$ 218 for eCommerce non-cooperators for statistical consistency, trendability, and statistical aberrations using a statistical outlier correction process. The non-cooperators estimator 222 uses the expansion factor $xF_h$ 116 to estimate eCommerce non-cooperators sales $sE_{hp}$ 112 for a strata h and a product p using, for example, the example mathematical expression of EQN (2B).

$$sE_{hp} = xF_h * CNT(s_{hp}) \qquad \text{EQN (2B)}$$

In this example, the non-cooperators estimator 222 implements means for estimating non-cooperators sales. The means for estimating non-cooperators sales may additionally or alternatively be implemented by the processor 802 of FIG. 8.

To compute estimated total eCommerce sales $UE_{hp}$ 224, the example sales modeler 114 of FIG. 2 includes an example sales estimator 226. The example sales estimator 226 of FIG. 2 combines the estimated eCommerce non-cooperators sales $sE_{hp}$ 112 and the eCommerce cooperators sales data G*102 to estimate the total eCommerce sales $UE_{hp}$ 224. For example, the sales estimator 226 combines the estimated eCommerce non-cooperators sales $sE_{hp}$ 112 and the eCommerce cooperators sales data $G*_{hp}$ 102 for each strata h and product p using the example mathematical expression of EQN (2C).

$$UE_{hp} = CNT(G*_{hp}) + sE_{hp} \qquad \text{EQN (2C)}$$

In this example, the sales estimator 226 implements means for estimating total sales. The means for estimating total sales may additionally or alternatively be implemented by the processor 802 of FIG. 8.

To compute per-product sales and total eCommerce sales, the example sales modeler 114 of FIG. 2 includes an example eCommerce estimator 228. The example eCommerce estimator 228 of FIG. 2 combines the estimated total eCommerce sales $UE_{hp}$ 224 for multiple strata h and a productp to obtain estimated sales $UE_p$ 230 for the product p. For example, the estimated sales $UE_p$ 230 can be computed by the example eCommerce estimator 228 using the example mathematical expression of EQN (2D).

$$UE_p = \Sigma UE_{hp} \qquad \text{EQN (2D)}$$

In this example, the eCommerce estimator 228 implements means for estimating per-product sales. The means for estimating per-product sales may additionally or alternatively be implemented by the processor 802 of FIG. 8.

The eCommerce estimator 228 combines the estimated sales $UE_p$ 230 for multiple products to obtain an estimate of total eCommerce sales UE 232. The estimated total eCommerce sales UE 232 can be determined by the example eCommerce estimator 228 using the example mathematical expression of EQN (2E).

$$UE = \Sigma UE_p \qquad \text{EQN (2E)}$$

While an example manner of implementing the example sales modeler 114 of FIG. 1 is illustrated in FIG. 2, one or more of the elements, processes and/or devices illustrated in FIG. 2 may be combined, divided, re-arranged, omitted, eliminated and/or implemented in any other way. Further, the example splitter 202, the example matcher 208, the example stratifier 214, the example factor determiner 220, the eCommerce non-cooperators estimator 222, the example sales estimator 226, the example eCommerce estimator 228 and/or, more generally, the example sales modeler 114 of FIG. 2 may be implemented by hardware, software, firmware and/or any combination of hardware, software and/or firmware. Thus, for example, any of the example splitter 202, the example matcher 208, the example stratifier 214, the example factor determiner 220, the eCommerce non-cooperators estimator 222, the example sales estimator 226, the example eCommerce estimator 228 and/or, more generally, the example sales modeler 114 could be implemented by one or more analog or digital circuit(s), logic circuits, programmable processor(s), programmable controller(s), GPU(s), DSP(s), ASICNT(s), PLD(s), FPGA(s), and/or FPLD(s). When reading any of the apparatus or system claims of this patent to cover a purely software and/or firmware implementation, at least one of the example splitter 202, the example matcher 208, the example stratifier 214, the example factor determiner 220, the eCommerce non-cooperators estimator 222, the example sales estimator 226, the example eCommerce estimator 228, and/or the example sales modeler 114 is/are hereby expressly defined to include a non-transitory computer-readable storage device or storage disk such as a memory, a DVD, a CD, a CD-ROM, a Blu-ray disk, etc. including the software and/or firmware. Further still, the example sales modeler 114 of FIG. 2 may include one or more elements, processes and/or devices in addition to, or instead of, those illustrated in FIG. 2, and/or may include more than one of any or all of the illustrated elements, processes and devices.

Figure 3:
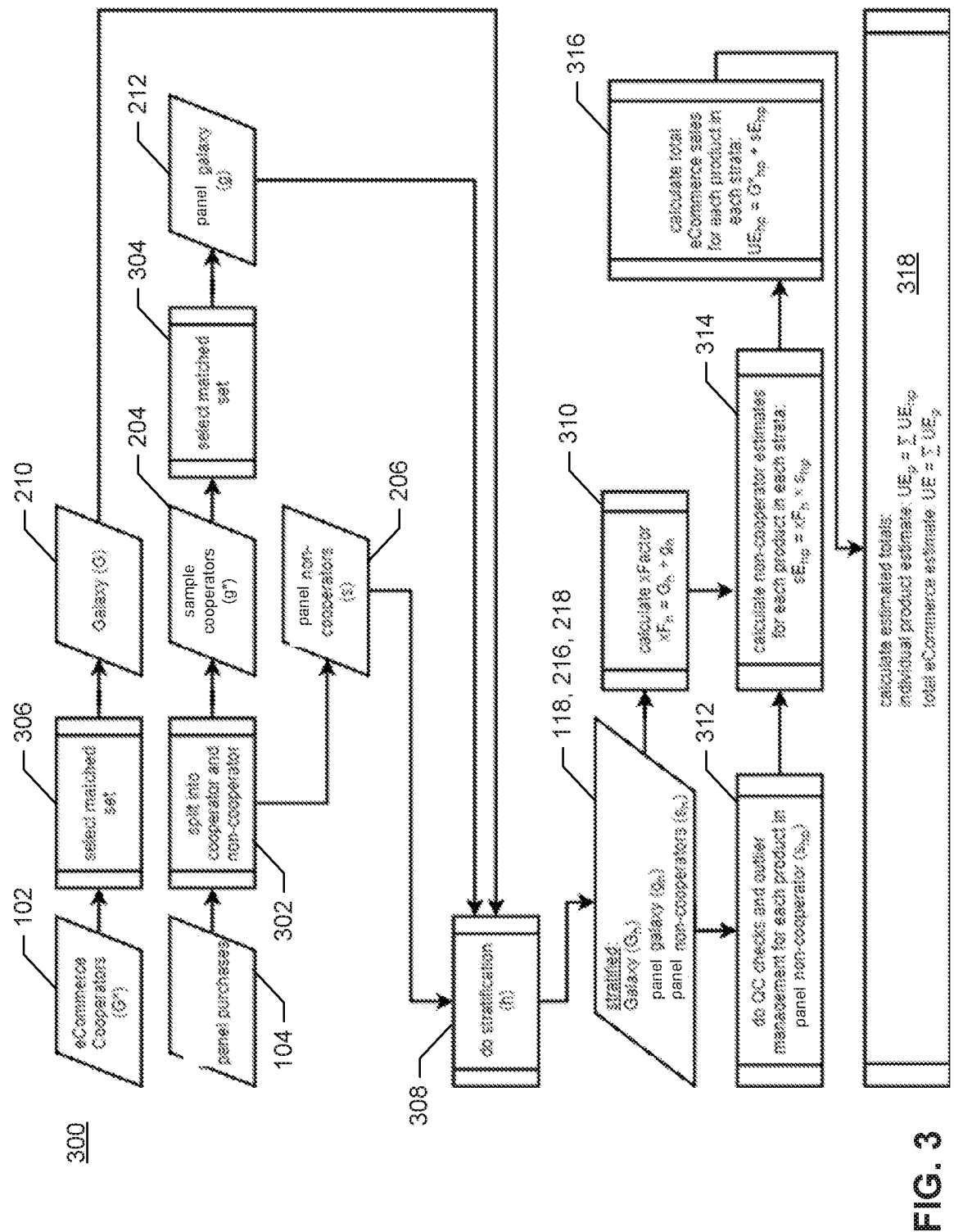
FIG. 3 is a flowchart representative of example hardware logic or machine-readable instructions for implementing the sales modeler of FIG. 1 and FIG. 2 to model eCommerce non-cooperators sales.

A flowchart representative of example hardware logic, machine-readable instructions, hardware implemented state machines, and/or any combination thereof for implementing the sales modeler of FIG. 1 and/or FIG. 2 is shown in FIG. 3. The machine-readable instructions may be an executable program or portion of an executable program for execution by a computer processor such as the processor 802 shown in the example processor platform 800 discussed below in connection with FIG. 8. The program may be embodied in software stored on a non-transitory computer-readable storage medium such as a CD, a CD-ROM, a floppy disk, a hard drive, a DVD, a Blu-ray disk, or a memory associated with the processor 802, but the entire program and/or parts thereof could alternatively be executed by a device other than the processor 802 and/or embodied in firmware or dedicated hardware. Further, although the example program is described with reference to the flowchart illustrated in FIG. 3, many other methods of implementing the example sales modeler 114 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a PLD, an FPLD, a comparator, an operational-amplifier (op-amp), a logic circuit, etc.) structured to perform the corresponding operation without executing software or firmware.

The program 300 of FIG. 3 begins at block 302 where, for example, the splitter 202 splits the panel sales data 104 (panel purchases) into panel sales data G*204 for eCommerce cooperators, and panel sales data s 206 for eCommerce non-cooperators (block 302).

The example matcher 208 matches (e.g., sorts, orders, etc.) sales in the panel sales data G*204 for eCommerce cooperators based on product category (e.g., beauty, furniture, grocery, etc.) and/or by product to form matched panel sales data G 212 for eCommerce cooperators (block 304). The matcher 208 likewise matches (e.g., sorts, orders, rearranges, etc.) purchases of the eCommerce cooperators sales data G*102 based on product category (e.g., beauty, furniture, grocery, etc.) and/or by product to form matched eCommerce cooperators sales data G 210 (block 306).

The stratifier 214 splits the matched eCommerce cooperators sales data G 210 into strata h to form stratified eCommerce cooperators sales data $G_h$ 118, stratifies the panel sales data G 212 for eCommerce cooperators into stratified panel sales data $g_h$ 216 for eCommerce cooperators, and splits the panel sales data s 206 for eCommerce non-cooperators into stratified panel sales data $s_h$ 218 for eCommerce non-cooperators (block 308).

The factor determiner 220 computes an expansion factor $xF_h$ 116 that represents a ratio of the number of eCommerce cooperators sales data $G_h$ 118 and the number of panel sales data $g_h$ 216 for eCommerce cooperators for a strata h (block 310). The expansion factor $xF_h$ 116 can be computed by factor determiner 220 using the mathematical expression of EQN (2A).

In some examples, quality checks and/or outlier management for each product p and strata h are carried out (block 312). The non-cooperators estimator 222 uses the expansion factor $xF_h$ 116 to estimate eCommerce non-cooperators sales $sE_{hp}$ 112 for a strata h and a productp using, for example, the example mathematical expression of EQN (2B) (block 314).

The example sales estimator 226 combines the estimated eCommerce non-cooperators sales $sE_{hp}$ 112 and the eCommerce cooperators sales data G*102 to estimate the total eCommerce sales $UE_{hp}$ 224 (block 316). For example, the sales estimator 226 combines the estimated eCommerce non-cooperators sales $sE_{hp}$ 112 and the eCommerce cooperators sales data $G^*_{hp}$ 102 for each strata h and product p using the example mathematical expression of EQN (2C).

The example eCommerce estimator 228 combines the total eCommerce sales $UE_{hp}$ 224 for multiple strata h to obtains estimated per-product sales $UE_p$ 230 (block 318). The eCommerce estimator 228 combines the estimated per-product sales $UE_p$ 230 for multiple products to obtain an estimate of total eCommerce sales UE 232 (block 318). Control then exits from the example program 300 of FIG. 3.

Figure 4:
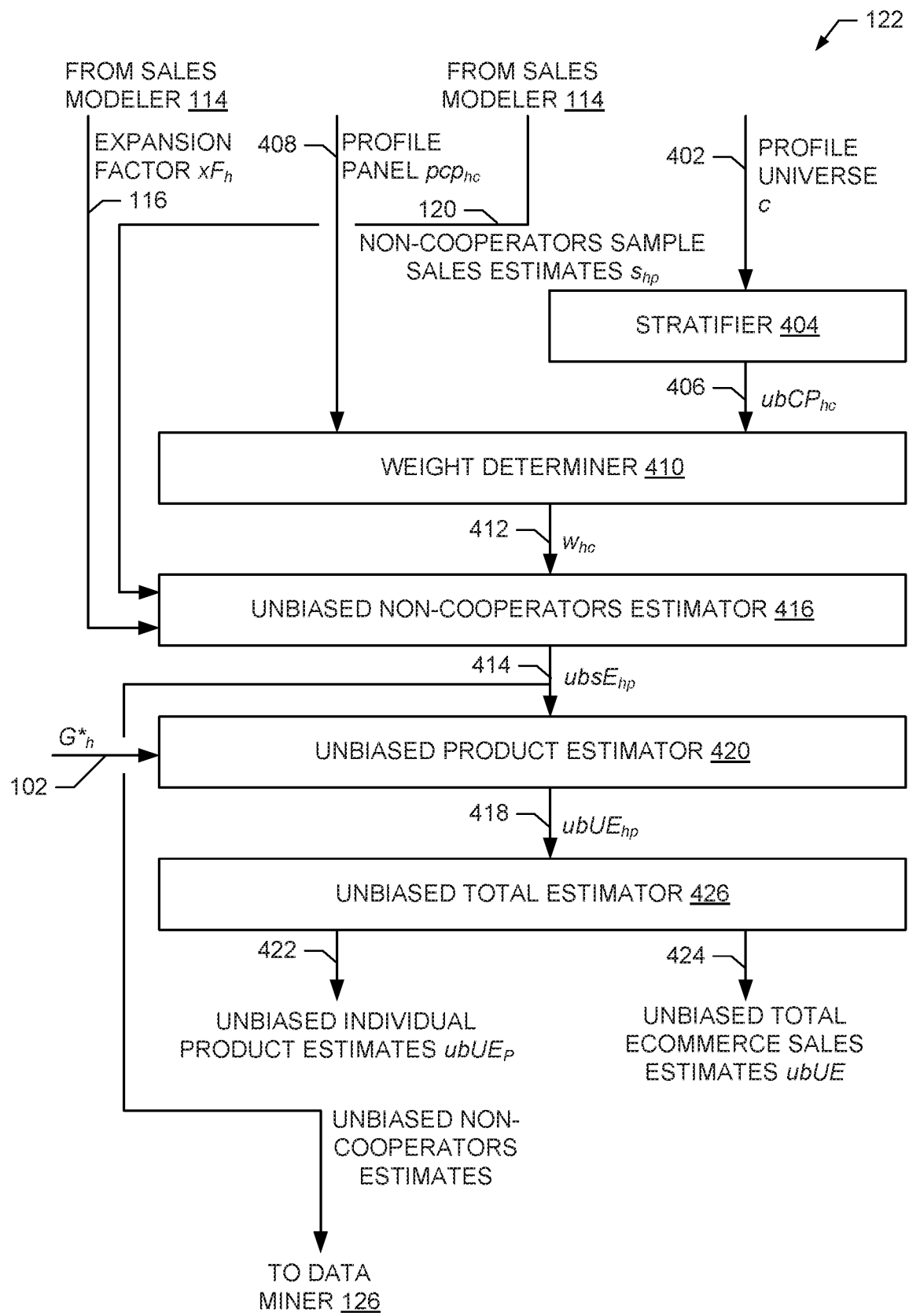
FIG. 4 is a block diagram illustrating an example implementation of the example bias reducer of FIG. 1.

FIG. 4 is a block diagram illustrating an example implementation of the example bias reducer 122 of FIG. 1. Panels are typically limited in size due to, for example, practical concerns (e.g., the willingness of persons to participate in a panel, costs, etc.). Such size constraints can result in statistical biases in the composition of the panel and, thus, statistical biases in sales data recorded by the panel. Traditional discretionary behaviors, guesswork, and/or reliance on heuristics can produce further erroneous and/or otherwise biased results. The example bias reducer 122 of FIG. 4 computes unbiased sales estimates in a manner devoid of analyst discretion, guesswork and/or bias. Accordingly, more accurate sales estimates can be obtained from biased panel sales data g*206 and s 206. Therefore, the example methods, systems, apparatus and articles of manufacture disclosed herein to model eCommerce sales are more computationally efficient than traditional methods by accurately providing unbiased sales estimates that reflect a full range of products and strata, without having to recruit, manage and pay for large numbers of panel members.

To stratify a set of profiles c 402 of a large set of purchasers, the example bias reducer 122 of FIG. 4 includes an example stratifier 404. The example stratifier 404 of FIG. 4 splits the set of profiles c 402 (e.g., a profile universe) of the large set of purchasers into stratified unbiased consumer profiles $ubCP_{hc}$ 406. The stratified unbiased consumer profiles $ubCP_{hc}$ 406 reflects the numbers of purchaser in a plurality of strata h. A stratified set of panel profiles $pcp_{hc}$ 408 of the members of a panel reflects the numbers of panel members in each of the plurality of strata h. Differences between the unbiased consumer profiles $ubCP_{hc}$ 406 and the stratified set of panel profiles $pcp_{hc}$ 408 may represent a bias in panel membership. In this example, the stratifier 404 implements first means for stratifying. The means for stratifying may additionally or alternatively be implemented by the processor 802 of FIG. 8.

The set of profiles c 402 can be obtained using large-scale surveys, such as, readership surveys, a census, etc. that are intended to represent the full population of consumers in terms of attributes, such as, age, gender, location, socioeconomic class, household size and composition, etc. These attributes can be used to stratify the set of profiles c 402 and the panel members.

To reduce bias in panel sales data, the example bias reducer 122 of FIG. 4 includes an example weight determiner 410. The example weight determiner 410 of FIG. 4 calculates weights $w_{hc}$ 412 that reflect differences (e.g., ratios, etc.) between the unbiased consumer profiles $ubCP_{hc}$ 406 and the stratified set of panel profiles $pcp_{hc}$ 408. An example mathematical expression that can be used by the example weight determiner 410 to compute the weights $w_{hc}$ 412 is shown in EQN (4A).

$$w_{hc}=(ubCP_{hc} \div \Sigma ubcP_{hc})/(pcp_{hc} \div \Sigma pcp_{hc}) \quad \text{EQN (4A)}$$

In this example, the weight determiner 410 implements means for determining weights. The means for determining weights may additionally or alternatively be implemented by the processor 802 of FIG. 8.

To estimate unbiased eCommerce non-cooperators sales $ubsE_{hp}$ 414 for the set of profiles c, the example bias reducer 122 of FIG. 4 includes an example unbiased non-cooperators estimator 416. The unbiased non-cooperators estimator 416 uses the expansion factor $xF_h$ 116 and the weights $w_{hc}$ 412 to estimate unbiased eCommerce non-cooperators sales $ubsE_{hcp}$ for one of the set of profiles c, a strata h and a product p. For example, the unbiased product estimator 420 can estimate the unbiased eCommerce non-cooperators sales $ubsE_{hcp}$ using, for example, the example mathematical expression of EQN (4B).

$$ubsE_{hcp}=xF_h * w_{hc} * \text{CNT}(s_{hcp}) \quad \text{EQN (4B)}$$

The unbiased non-cooperators estimator 416 combines the unbiased eCommerce non-cooperators sales $ubsE_{hcp}$ to estimate the eCommerce non-cooperators sales $ubsE_{hp}$ 414 for a strata h and a product p. In some examples, the unbiased non-cooperators estimator 416 sums the unbiased eCommerce non-cooperators sales $ubsE_{hcp}$, as shown in the example mathematical expression of EQN (4C).

$$ubsE_{hp}=\Sigma ubsE_{hcp} \quad \text{EQN (4C)}$$

In this example, the unbiased non-cooperators estimate 416 implements means for estimating unbiased non-cooperators sales. The means for estimating unbiased non-cooperators sales may additionally or alternatively be implemented by the processor 802 of FIG. 8.

To calculate estimated unbiased sales $ubUE_{hp}$ 418 for each productp and strata h, the example bias reducer 122 of FIG. 4 includes an example unbiased product estimator 420. The example unbiased product estimator 420 of FIG. 4 combines the estimated unbiased eCommerce non-cooperators sales $ubsE_{hcp}$ with the eCommerce cooperators sales data G*102 to form the estimated unbiased sales $ubUE_{hp}$ 418 for each productp and strata h. The example unbiased product estimator 420 of FIG. 4 can combine the estimated unbiased eCommerce non-cooperators sales $ubsE_{hcp}$ with the eCommerce cooperators sales data G*102 using the example mathematical expression of EQN (4D).

$$ubUE_{hp}=G_{hp}^* + ubsE_{hp} \quad \text{EQN (4D)}$$

In this example, the unbiased product estimator 420 implements means for estimating unbiased sales. The means for estimating unbiased product sales may additionally or alternatively be implemented by the processor 802 of FIG. 8.

To estimate unbiased per-product sales $ubUE_p$ 422 and overall sales estimate ubUE 424, the example bias reducer 122 includes an example unbiased total estimator 426. The unbiased total estimator 426 combines the estimated unbiased sales $ubUE_{hp}$ 418 across the strata h to form the per-product sales ub $UE_p$ 422. The total estimator 426 can form the product sales ubUE 422 using the example mathematical expression of EQN (4E).

$$ubUE_p=\Sigma ubUE_{hp} \quad \text{EQN (4E)}$$

The unbiased total estimator 426 combines the unbiased product sales $ubUE_p$ 422 across the products p to form the overall sales estimate ubUE 424. The total estimator 426 can form the overall sales estimate ubUE 424 using the example mathematical expression of EQN (4F).

$$ubUE=\Sigma ubUE_p \quad \text{EQN (4F)}$$

In this example, the unbiased total estimator 222 implements means for estimating unbiased total sales. The means for estimating unbiased total sales may additionally or alternatively be implemented by the processor 802 of FIG. 8.

While an example manner of implementing the bias reducer 122 of FIG. 1 is illustrated in FIG. 4, one or more of the elements, processes and/or devices illustrated in FIG. 4 may be combined, divided, re-arranged, omitted, eliminated and/or implemented in any other way. Further, the example stratifier 404, the example weight determiner 410, the example unbiased non-cooperators estimator 416, the example unbiased product estimator 420, the example unbiased total estimator 426, and/or, more generally, the example bias reducer 122 of FIG. 4 may be implemented by hardware, software, firmware and/or any combination of hardware, software and/or firmware. Thus, for example, any of the example stratifier 404, the example weight determiner 410, the example unbiased non-cooperators estimator 416, the example unbiased product estimator 420, the example unbiased total estimator 426, and/or, more generally, the example bias reducer 122 of FIG. 4 could be implemented by one or more analog or digital circuit(s), logic circuits, programmable processor(s), programmable controller(s), GPU(s), DSP(s), ASICNT(s), PLD(s), FPGA(s), and/or FPLD(s). When reading any of the apparatus or system claims of this patent to cover a purely software and/or firmware implementation, at least one of the example stratifier 404, the example weight determiner 410, the example unbiased non-cooperators estimator 416, the example unbiased product estimator 420, the example unbiased total estimator 426, and/or the example bias reducer 122 is/are hereby expressly defined to include a non-transitory computer-readable storage device or storage disk such as a memory, a DVD, a CD, a CD-ROM, a Blu-ray disk, etc. including the software and/or firmware. Further still, the example bias reducer 122 of FIG. 4 may include one or more elements, processes and/or devices in addition to, or instead of, those illustrated in FIG. 4, and/or may include more than one of any or all of the illustrated elements, processes and devices.

Figure 5:
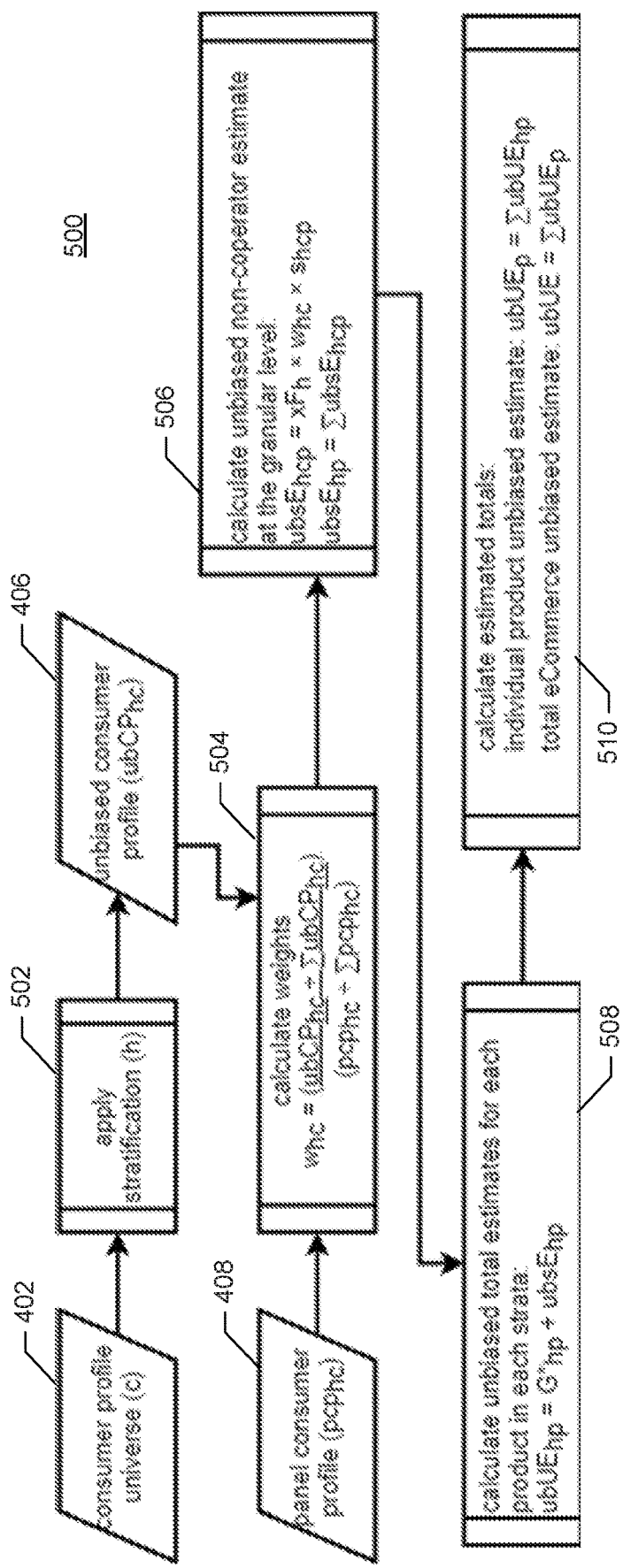
FIG. 5 is a flowchart representative of example hardware logic or machine-readable instructions for implementing the bias reducer of FIG. 1 and FIG. 3 to reduce bias in eCommerce non-cooperators sales estimates.

A flowchart representative of example hardware logic, machine-readable instructions, hardware implemented state machines, and/or any combination thereof for implementing the bias reducer 122 of FIG. 1 and/or FIG. 4 is shown in FIG. 5. The machine-readable instructions may be an executable program or portion of an executable program for execution by a computer processor such as the processor 802 shown in the example processor platform 800 discussed below in connection with FIG. 8. The program may be embodied in software stored on a non-transitory computer-readable storage medium such as a CD, a CD-ROM, a floppy disk, a hard drive, a DVD, a Blu-ray disk, or a memory associated with the processor 802, but the entire program and/or parts thereof could alternatively be executed by a device other than the processor 802 and/or embodied in firmware or dedicated hardware. Further, although the example program is described with reference to the flowchart illustrated in FIG. 5, many other methods of implementing the example bias reducer 122 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a PLD, an FPLD, a comparator, an operational-amplifier (op-amp), a logic circuit, etc.) structured to perform the corresponding operation without executing software or firmware.

The program 500 of FIG. 5 begins at block 502 where, for example, the stratifier 404 splits the set of profiles c 402 of the large set of purchasers into stratified unbiased consumer profiles $ubCP_{hc}$ 406 (block 502).

The weight determiner 410 of FIG. 4 calculates weights $w_{hc}$ 412 that reflect differences (e.g., ratios, etc.) between the unbiased consumer profiles $ubCP_{hc}$ 406 and the stratified set of panel profiles $pcp_{hc}$ 408 (block 504) using, for example, the example mathematical expression of EQN (4A).

The unbiased product estimator 420 uses the expansion factor $xF_h$ 116 and the weights $w_{hc}$ 412 to estimate unbiased eCommerce non-cooperators sales $ubsE_{hcp}$ for one of the set of profiles c, a strata h and a product p (block 506) using, for example, the example mathematical expression of EQN (4B), and combines the unbiased eCommerce non-cooperators sales $ubsE_{hcp}$ to estimate the eCommerce non-cooperators sales $ubsE_{hp}$ 414 for a strata h and a product p using, for example, the example mathematical expression of EQN (4C). The example unbiased product estimator 420 of FIG. 4 combines the estimated unbiased eCommerce non-cooperators sales $ubsE_{hcp}$ with the eCommerce cooperators sales data G*102 to form the estimated unbiased sales $ubUE_{hp}$ 418 for each product p and strata h (block 508) using, for example, the example mathematical expression of EQN (4D).

The unbiased total estimator 426 combines the estimated unbiased sales $ubUE_{hp}$ 418 across the strata h to form the per-product sales $ubUE_p$ 422 (block 510) using, for example, the example mathematical expression of EQN (4E), and combines the unbiased per-product sales $ubUE_p$ 422 across the products p to form the overall sales estimate ubUE 424 using, for example, the example mathematical expression of EQN (4F). Control then exits from the example program 500 of FIG. 5.

Panel sizes can result in an under-representation (e.g., partially, wholly, etc.) of purchases from eCommerce cooperators and/or eCommerce non-cooperators. Accordingly, eCommerce sales estimates can fail to capture all aspects of eCommerce sales. Therefore, marketing, sales, etc. decisions by manufacturers, eCommerce entities, etc. based on recorded panel purchases can be incorrect, requiring traditional discretionary behaviors, guesswork, and/or reliance on heuristics to reduce. In contrast, the example data miner 126 captures commerce metric data representing a large set of eCommerce entities, and uses the commerce metric data to extrapolate from sales recorded by the panel to form sales estimates for a much larger set of eCommerce entities for which recorded panel sales data is not available.

Figure 6:
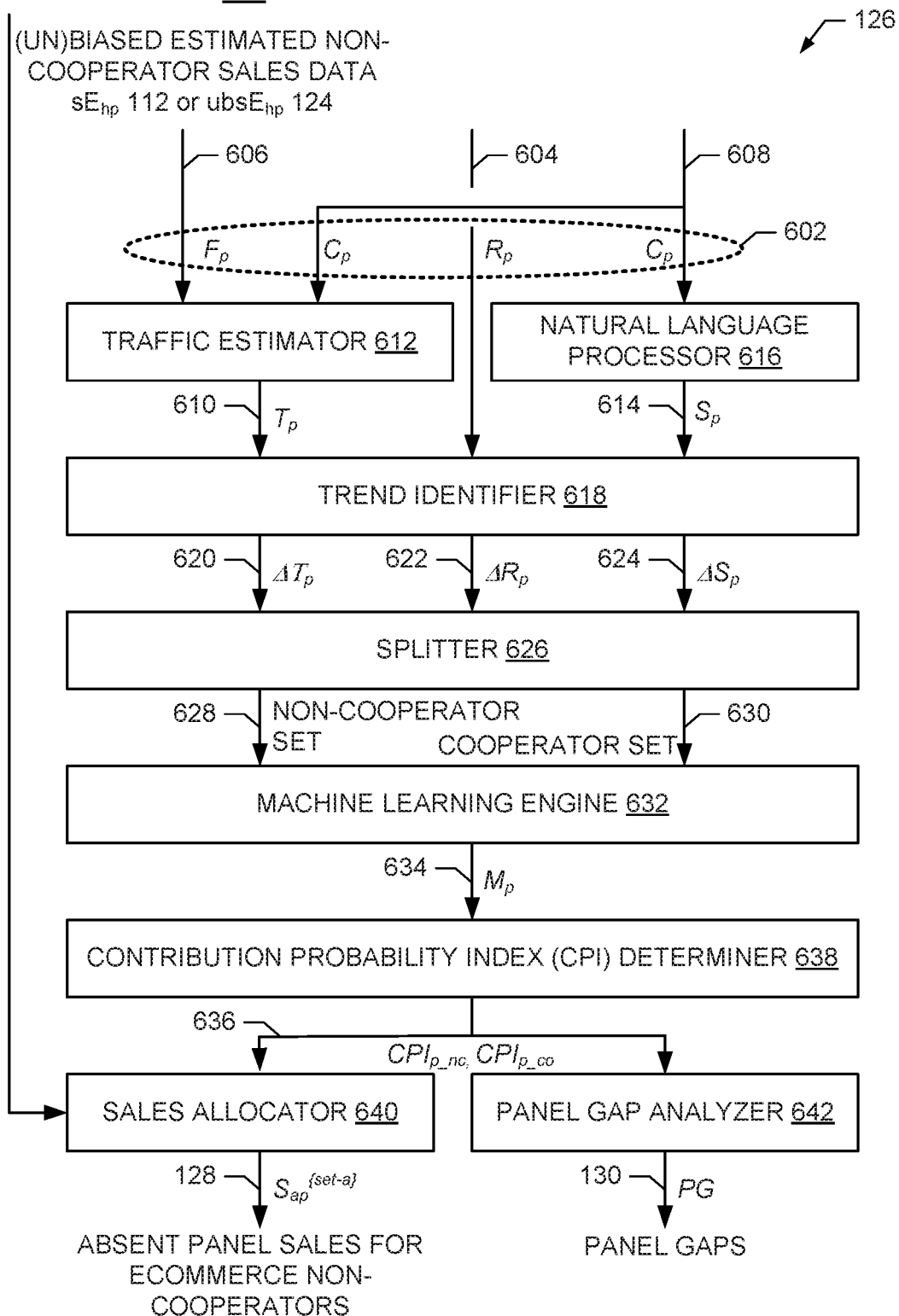
FIG. 6 is a block diagram illustrating an example implementation of the example data miner of FIG. 1.

FIG. 6 is a block diagram illustrating an example implementation of the example data miner 126 of FIG. 1. The example data miner 126 of FIG. 6 processes commerce metrics 602 (e.g., publicly available product information, such as ratings $R_p$ 604, feedback instances $F_p$ 606, comments and/or questions $C_p$ 608, etc.). The ratings $R_p$ 604, feedback instances $F_p$ 606, comments and/or questions $C_p$ 608 is obtained, for example, from eCommerce non-cooperators websites using web scraping (e.g., web harvesting, web data extraction, etc.).

To determine traffic counts $T_p$ 610 for products p, the example data miner 126 of FIG. 6 includes an example traffic estimator 612. The example traffic estimator 612 of FIG. 6 combines the scraped feedback instances $F_p$ 606 and the number of comments and/or questions C 608 to estimate the number views of a product p on eCommerce non-cooperators websites. In some examples, the traffic estimator 612 computes the traffic counts $T_p$ 610 using the example mathematical expression of EQN (6A).

$$T_p = F_p + CNT(C_p) \qquad \text{EQN (6A)}$$

In this example, the traffic estimator 612 implements means for estimating traffic counts. The means for estimating traffic counts may additionally or alternatively be implemented by the processor 802 of FIG. 8.

To characterize sentiments S 614 expressed in the comments and/or questions $C_p$ 608, the example data miner 126 of FIG. 6 includes an example natural language processor 616. The example natural language processor 616 of FIG. 6 processes the scraped comments and/or questions $C_p$ 608 to assess the consumer, shopper, etc. sentiments $S_p$ 614 (e.g., attitude, feeling, mood, emotion, etc.) of viewers of a product p as conveyed by their comments and/or questions $C_p$ 608. In some examples, a sentiment $S_p$ 614 is assigned a value selected from {−1=completely negative, 0=neutral, +1=completely positive, between −1 and 0=negative, between 0 and 1=positive}. Natural language processing involves converting blocks of text into formal representations that can be used to manipulate and determine, among other things, the sentiment or emotion of the writer. Generally speaking, sentiment analysis aims to determine the attitude of the writer with respect to the online product they are commenting on. In this example, the example natural language processor 616 implements means for processing language. The means for processing language may additionally or alternatively be implemented by the processor 802 of FIG. 8.

To calculate commerce metric difference values, the example data miner 126 of FIG. 6 includes an example trend identifier 618. In some examples, commerce metric difference values are temporal changes of the ratings $R_p$ 604, the traffic counts $T_p$ 610 and/or the sentiments $S_p$ 614. The example trend identifier 618 of FIG. 6 computes a trend metric (e.g., a change) $\Delta T_p$ 620 in the traffic counts $T_p$ 610 using the example mathematical expression of EQN (6B).

$$\Delta T_p = T_p[\text{current}] - T_p[\text{previous}] \quad \text{EQN (6B)}$$

where current refers to a first time period (e.g., a current time period), and previous refers to a second time period (e.g., a previous time period). In examples disclosed herein, two time periods are used to calculate the values of each input during the time period in which the sales happened. For example, if a previous time period had an average rating of 3.0 given by 100 people, and the current time period had an average rating was 3.1 given by 110 people, 10 additional people provided ratings in the current period, and these 10 people would have given an average rating of [(3.1×110)−(3.0×100)]÷(110−100)=4.1. So we need to calculate this JR as this is the influencer to sales in this period. In some examples, the trend identifier 618 computes a trend metric (e.g., a change) $\Delta R_p$ 622 in the ratings $R_p$ 604 using the example mathematical expression of EQN (6C).

$$\Delta R_p = [R_p[\text{current}] * T_p[\text{current}] - R_p[\text{previous}] * T_p[\text{previous}]] / \Delta T_p \quad \text{EQN (6C)}$$

In some examples, the trend identifier 618 computes a trend metric (e.g., a change) $\Delta S_p$ 624 in the sentiments Sp 614 using the example mathematical expression of EQN (6D).

$$\Delta S_p = [S_p[\text{current}] * T_p[\text{current}] - S_p[\text{previous}] * T_p[\text{previous}]] / \Delta T_p \quad \text{EQN (6D)}$$

In this example, the trend identifier 618 implements means for determining trends. The means for determining trends may additionally or alternatively be implemented by the processor 802 of FIG. 8.

To split trend data, the example data miner 126 includes an example splitter 626. The example splitter 626 of FIG. 6 splits (e.g., segregates, etc.) the trend data $\Delta T_p$ 620, $\Delta R_p$ 622, and $\Delta S_p$ 624 according different sets of eCommerce entities. For example, the splitter 626 splits the trend data $\Delta T_p$ 620, $\Delta R_p$ 622, and $\Delta S_p$ 624 into a non-cooperator set 628 associated with a first dataset of non-cooperators eCommerce entities, and a cooperator set 630 associated with a second dataset of cooperators eCommerce entities. In this example, the splitter 626 implements second means for splitting. The second means for splitting may additionally or alternatively be implemented by the processor 802 of FIG. 8.

To predict sales, the example data miner 126 of FIG. 6 includes an example machine learning engine 632. The example machine learning engine 632 of FIG. 6 estimates eCommerce non-cooperators sales $M_p$ 634 based trend data sets 628, 630. The machine learning engine 632 is trained with supervised learning with the cooperator set 630 of the trend data $\Delta T_p$ 620, $\Delta R_p$ 622, and $\Delta S_p$ 624 providing inputs for the machine learning engine 632. Outputs of the machine learning engine 632 are compared with the eCommerce cooperators sales data $G_p*102$ and used to update coefficients of the machine learning engine 632. A first portion of the cooperator set 630 of the trend data $\Delta T_p$ 620, $\Delta R_p$ 622, and $\Delta S_p$ 624 can be used to train the machine learning engine 632, and a second portion of the cooperator set 630 of the trend data $\Delta T_p$ 620, $\Delta R_p$ 622, and $\Delta S_p$ 624 can be used to test the machine learning engine 632. After the machine learning engine 632 is trained, the non-cooperator set 628 of the trend data $\Delta T_p$ 620, $\Delta R_p$ 622, and $\Delta S_p$ 624 (training data) is passed through the machine learning engine 632 to form the estimated eCommerce non-cooperators sales $M_p$ 634. In some examples, the machine learning engine 632 uses supervised machine learning techniques. The machine learning engine 632 iterates through the training data and determines coefficients for which the machine learning engine 632 most closely estimates the eCommerce cooperators sales data $G_p*102$ (a.k.a. truth data, target data, etc.) for a given period using the web-scraped ratings $R_p$ 604, traffic counts $T_p$ 610 and/or sentiments $S_p$ 614 for the same product p for the same period. In this example, the machine learning engine 632 implements means for predicting. The means for predicting may additionally or alternatively be implemented by the processor 802 of FIG. 8.

To determine per-product CPIs 636, the example data miner 126 of FIG. 6 includes an example CPI determiner 638. The example CPI determiner 638 of FIG. 6 computes a $CPI_{p\_co}$ for each product p sold by an eCommerce cooperator entity on its website. An example $CPI_p$ value represents what percentage of all products sold are product p. The $CPI_{p\_co}$ values are the relative value of $G_p*102$ for a product divided by a sum of the outputs M 634 of the machine learning engine 632 and the eCommerce cooperators sales data $G_p*$. The $CPI_{p\_co}$ for each productp can be computed by the example CPI determiner 638 using the example mathematical expression of EQN (6E).

$$CPI_{p\_co} = G_p* / \Sigma(G_p* + M_p) \quad \text{EQN (6E)}$$

The CPI determiner 638 likewise computes a $CPI_{p\_nc}$ value for each productp sold by an eCommerce non-cooperator on its website. The $CPI_{p\_nc}$ values are the relative value of $M_p$ 634 divided by the sum the outputs $M_p$ of the machine learning engine 632 and the eCommerce cooperators sales data $G_p*$. The $CPI_{p\_nc}$ for each product p can be computed by the CPI determiner 638 using the example mathematical expression of EQN (6F).

$$CPI_{p\_nc} = M_p / \Sigma(G_p* + M_p) \quad \text{EQN (6F)}$$

In this example, the CPI determiner 638 implements means for determining product ratios. The means for determining product ratios may additionally or alternatively be implemented by the processor 802 of FIG. 8.

To correct for absent product purchases, the example data miner 126 of FIG. 6 includes an example sales allocator 640. In some examples, missing products are products with a higher CPI (indicating they are likely to have been purchased) but are not present in the panel sales data 104. These products are expected to have been sold by an eCommerce entity but, for some reason, are absent from the panel sales data 104. The sales allocator 640 divides a list of products identified from the available product information (e.g., ratings $R_p$ 604, feedback instances $F_p$ 606, comments and/or questions $C_p$ 608, etc.) into a set of absent products {set-a} and a set of present products {set-p}. The sales allocator 640 reallocates sales of {set-p} into allocated sales $sa_p$ for {set-a} 640, and absent panel sales $sa_p$ for {set-p} 128 for eCommerce non-cooperators. For example, the sales allocator 640 reallocates sales according to the example mathematical expression of EQN (6G).

$$sa_p^{\{set-a\}}:sa_p^{\{set-p\}}=sE_p^{\{set-p\}}*[CPI_p^{\{set-a\}}:CPI_p^{\{set-p\}}] \quad \text{EQN (6G)}$$

Where $sE_p$ is the eCommerce non-cooperators estimates $sE_{hp}$ 110 of FIGS. 1 and 2, or the unbiased eCommerce non-cooperators estimates $ubsE_{hp}$ 414 of FIG. 4. In the example of EQN (6G), the $CPI_p$ values are used to maintain the relative amounts of products sold. EQN (6G) determines how many sales to allocate to products that do not have recorded sales in the panel sales data 104. By allocating sales as shown in EQN (6D), overestimation of the sales of products present in the panel sales data 104 can be reduced. In this example, the sales allocator 640 implements means for allocating sales. The means for allocating sales may additionally or alternatively be implemented by the processor 802 of FIG. 8.

To identify statistical gaps in panel composition (e.g., a missing consumer class, strata, etc.), the example data miner 126 of FIG. 6 includes an example panel gap analyzer 642. The example panel gap analyzer 642 of FIG. 6 uses the CPI values 636 and sales estimates for the panel sE to compute panel gaps PG 130. For example, the panel gap analyzer 642 can use the example mathematical expression of EQN (6H) to compute panel gaps $PG_p$ per product p.

$$PG_p=CPI_p-(sE_p/\Sigma sE_p), \quad \text{EQN (6H)}$$

where $sE_p$ is the eCommerce non-cooperators estimates $sE_{hp}$ 110 of FIGS. 1 and 2, or the unbiased eCommerce non-cooperators estimates $ubsE_{hp}$ 414 of FIG. 4. In EQN (6H), $sE_p$ is divided by its sum to form a relative value, thereby corresponding with the relative valued CPI values 636. The panel gap analyzer 642 identifies missing aspect of a panel (e.g., a consumer class, a strata, etc.) by splitting the panel gaps by productp, strata h, and consumer class c using, for example, the example mathematical expression of EQN (6O.

$$PG_{hc}=\Sigma[PG_p*(sE_{hcp}/sE_{cp})] \quad \text{EQN (6O}$$

The panel gaps $PG_{hc}$ identifies which aspect of the panel is responsible for the absent products, thereby assisting in the recruitment of new panel members. In this example, the panel gap analyzer implements means for determining gaps. The means for determining gaps may additionally or alternatively be implemented by the processor 802 of FIG. 8.

While an example manner of implementing the data miner 126 of FIG. 1 is illustrated in FIG. 6, one or more of the elements, processes and/or devices illustrated in FIG. 6 may be combined, divided, re-arranged, omitted, eliminated and/or implemented in any other way. Further, the example traffic estimator 612, the example natural language processor 616, the example trend identifier 618, the example splitter 626, the example machine learning engine 632, the example CPI determiner 638, the example sales allocator 640, the example panel gap analyzer 642 and/or, more generally, the example data miner 126 of FIG. 6 may be implemented by hardware, software, firmware and/or any combination of hardware, software and/or firmware. Thus, for example, any of the example traffic estimator 612, the example natural language processor 616, the example trend identifier 618, the example splitter 626, the example machine learning engine 632, the example CPI determiner 638, the example sales allocator 640, the example panel gap analyzer 642 and/or, more generally, the example data miner 126 could be implemented by one or more analog or digital circuit(s), logic circuits, programmable processor(s), programmable controller(s), GPU(s), DSP(s), ASICNT(s), PLD(s), FPGA(s), and/or FPLD(s). When reading any of the apparatus or system claims of this patent to cover a purely software and/or firmware implementation, at least one of the example traffic estimator 612, the example natural language processor 616, the example trend identifier 618, the example splitter 626, the example machine learning engine 632, the example CPI determiner 638, the example sales allocator 640, the example panel gap analyzer 642 and/or the example data miner 126 is/are hereby expressly defined to include a non-transitory computer-readable storage device or storage disk such as a memory, a DVD, a CD, a CD-ROM, a Blu-ray disk, etc. including the software and/or firmware. Further still, the example data miner 126 of FIG. 6 may include one or more elements, processes and/or devices in addition to, or instead of, those illustrated in FIG. 6, and/or may include more than one of any or all of the illustrated elements, processes and devices.

Figure 7:
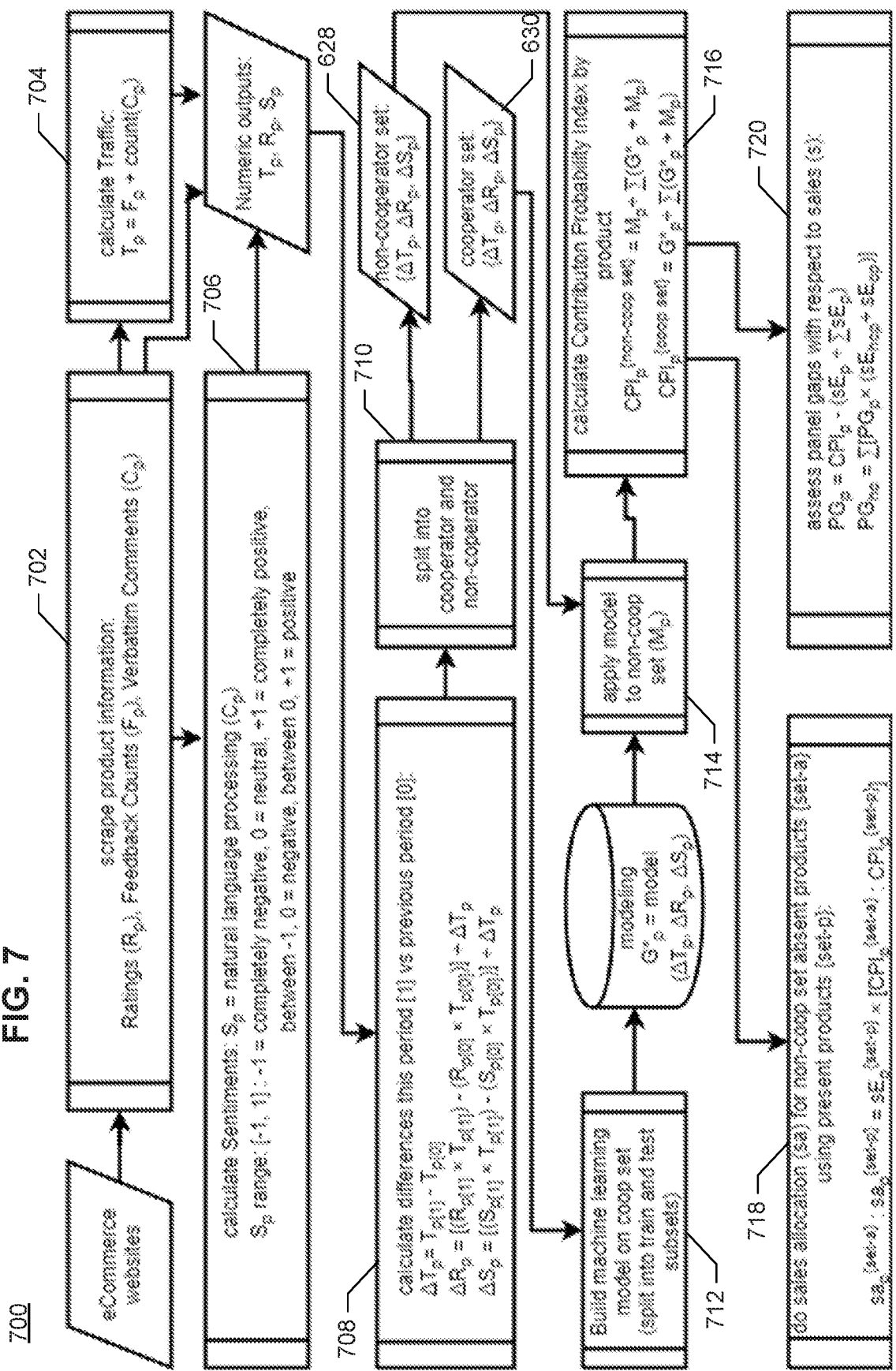
FIG. 7 is a flowchart representative of example hardware logic or machine-readable instructions for implementing the data miner of FIG. 1 and FIG. 6 to model eCommerce non-cooperators sales data.

A flowchart representative of example hardware logic, machine-readable instructions, hardware implemented state machines, and/or any combination thereof for implementing the data miner 126 of FIG. 1 and/or FIG. 6 is shown in FIG. 7. The machine-readable instructions may be an executable program or portion of an executable program for execution by a computer processor such as the processor 802 shown in the example processor platform 800 discussed below in connection with FIG. 8. The program may be embodied in software stored on a non-transitory computer-readable storage medium such as a CD, a CD-ROM, a floppy disk, a hard drive, a DVD, a Blu-ray disk, or a memory associated with the processor 802, but the entire program and/or parts thereof could alternatively be executed by a device other than the processor 802 and/or embodied in firmware or dedicated hardware. Further, although the example program is described with reference to the flowchart illustrated in FIG. 7, many other methods of implementing the example data miner 126 may alternatively be used. For example, the order of execution of the blocks may be changed, and/or some of the blocks described may be changed, eliminated, or combined. Additionally, and/or alternatively, any or all of the blocks may be implemented by one or more hardware circuits (e.g., discrete and/or integrated analog and/or digital circuitry, an FPGA, an ASIC, a PLD, an FPLD, a comparator, an operational-amplifier (op-amp), a logic circuit, etc.) structured to perform the corresponding operation without executing software or firmware.

The program 700 of FIG. 7 begins at block 702 where the data miner 126 and/or the data collector 106 scrapes eCommerce websites to obtain ratings $R_p$ 604, feedback instances $F_p$ 606, comments and/or questions $C_p$ 608, etc. (block 702). The example traffic estimator 612 combines the scraped feedback instances $F_p$ 606 and the number of comments and/or questions $C_p$ 608 to estimate the number views of a product p on eCommerce non-cooperators websites (block 704) using, for example, the example mathematical expression of EQN (6A).

The example natural language processor 616 of FIG. 6 processes the scraped comments and/or questions $C_p$ 608 to assess the sentiments $S_p$ 614 (e.g., attitude, feeling, mood, emotion, etc.) of viewers of a productp as conveyed by their comments and/or questions C 608 (block 706).

The example trend identifier 618 of FIG. 6 calculates eCommerce metric differences (e.g., temporal changes) $\Delta T_p$ 620, $\Delta R_p$ 622, and $\Delta S_p$ 624 in the ratings $R_p$ 604, the traffic counts $T_p$ 610 and the sentiments $S_p$ 614 (block 708). For example, the trend identifier 618 computes the eCommerce metric differences (e.g., temporal changes) $\Delta T_p$ 620, $\Delta R_p$ 622, and $\Delta S_p$ 624 using the example mathematical expressions of EQN (6B), EQN (6C), and EQN (6D).

The example splitter 626 of FIG. 6 splits the trend data $\Delta T_p$ 620, $\Delta R_p$ 622, and $\Delta S_p$ 624 into a non-cooperator set 628 and a cooperator set 630 (block 710).

The machine learning engine 632 is trained with supervised learning with the cooperator set 630 of the trend data $\Delta T_p$ 620, $\Delta R_p$ 622, and $\Delta S_p$ 624 as inputs of the machine learning engine 632, and outputs of the machine learning engine 632 compared with the eCommerce cooperators sales data $G_p$*102 to update coefficients of the machine learning engine 632 (block 712).

The non-cooperator set 628 of the trend data $\Delta T_p$ 620, $\Delta R_p$ 622, and $\Delta S_p$ 624 is passed through the machine learning engine 632 to form estimates $M_p$ 634 of eCommerce non-cooperators sales (block 714).

The example CPI determiner 638 of FIG. 6 computes $CPI_{p\_co}$ and $CPI_{p\_nc}$ values for each productp sold by an eCommerce cooperator entity on its website (block 716) using, for example, the mathematical expressions of EQN (6E), EQN (6F) and EQN (6G).

The sales allocator 640 divides a list of products identified from the available product information (e.g., ratings $R_p$ 604, feedback instances $F_p$ 606, comments and/or questions $C_p$ 608, etc.) into a set of absent products {set-a} and a set of present products {set-p}, and reallocates sales of {set-p} into allocated sales $sa_p$ for {set-a} 640 and $sa_p$ for {set-p} (block 718) using, for example, the example mathematical expression of EQN (6G).

The example panel gap analyzer 642 of FIG. 6 uses the CPI values 636 and sales estimates for the panel sE to compute panel gaps PG 130 (block 720) using, for example, the mathematical expressions of EQN (6H) and EQN (6I). Control then exits from the example program 700 of FIG. 7.

As mentioned above, the example processes of FIGS. 3, 5 and 7 may be implemented using executable instructions (e.g., computer and/or machine-readable instructions) stored on a non-transitory computer and/or machine-readable medium such as a hard disk drive, a flash memory, a read-only memory, a CD, a CD-ROM, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

Figure 8:
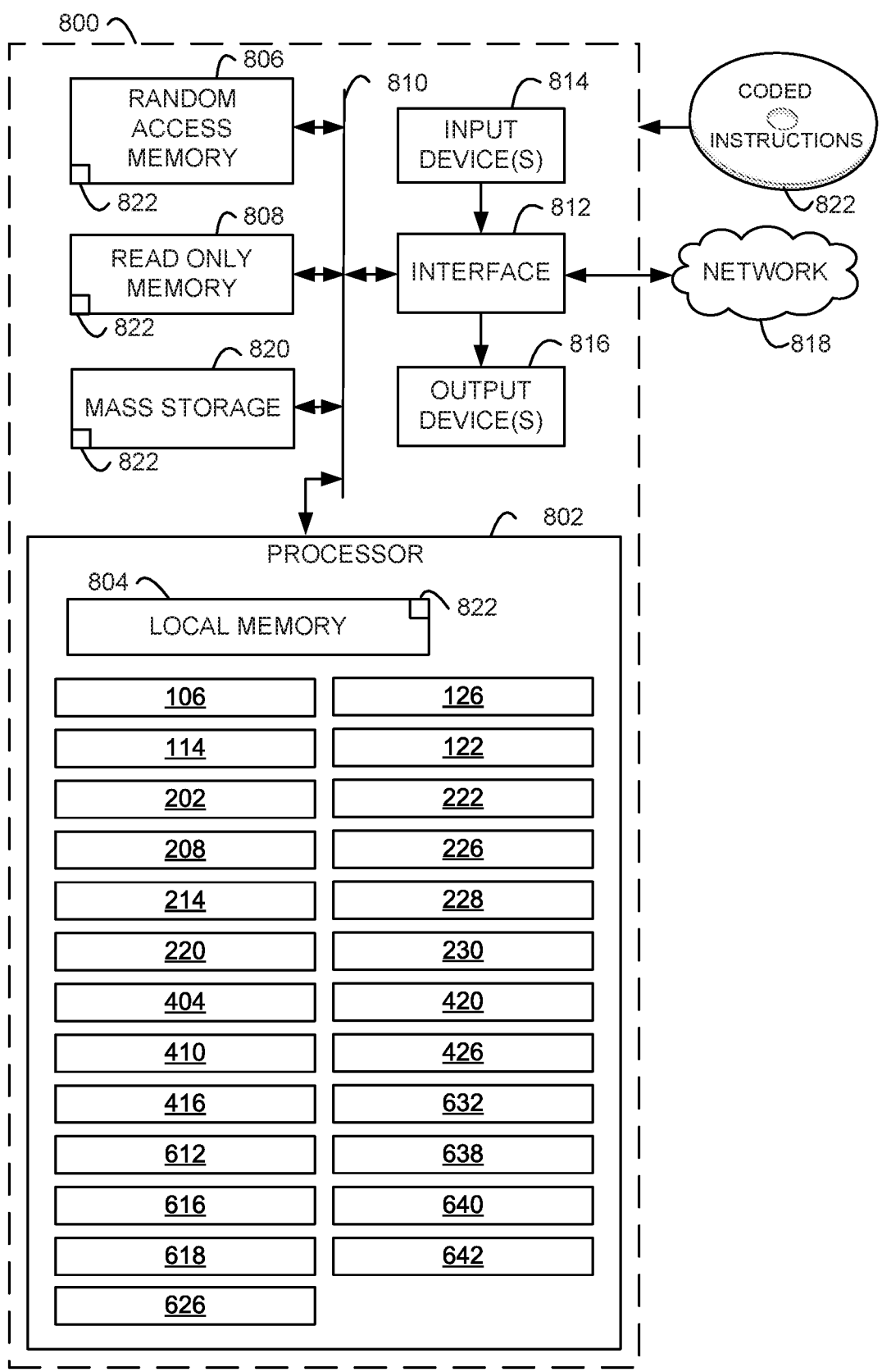
FIG. 8 illustrates an example processor platform structured to execute the example machine-readable instructions of FIG. 3 to implement the example sales modeler of FIGS. 1 and/or 2, the example machine-readable instructions of FIG. 5 to implement the example bias reducer of FIGS. 1 and/or 4, and/or the example machine-readable instructions of FIG. 7 to implement the example data miner of FIGS. 1 and/or 6.

FIG. 8 is a block diagram of an example processor platform 800 structured to execute the instructions of FIGS. 3, 5 and 7 to implement the example system 100 of FIG. 1, the example data collector 106, the example sales modeler 114 of FIG. 1 and FIG. 2, the example bias reducer 122 of FIG. 1 and FIG. 4, the example data miner 126 of FIG. 1 and FIG. 6. The processor platform 800 can be, for example, a server, a personal computer, a workstation, or any other type of computing device.

The processor platform 800 of the illustrated example includes a processor 802. The processor 802 of the illustrated example is hardware. For example, the processor 802 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data collector 106, the example sales modeler 114, the example bias reducer 122, the example data miner 126, the example splitter 202, the example matcher 208, the example stratifier 214, the example factor determiner 220, the example non-cooperators estimator 222, the example sales estimator 226, the example eCommerce estimator 228, the example stratifier 404, the example weight determiner 410, the example unbiased non-cooperators estimator 416, the example unbiased product estimator 420, the example unbiased total estimator 426, the example traffic estimator 612, the example natural language processor 616, the example trend identifier 618, the example splitter 626, the example machine learning engine 632, the example CPI determiner 638, the example sales allocator 640, and the example panel gap analyzer 642.

The processor 802 of the illustrated example includes a local memory 804 (e.g., a cache). The processor 802 of the illustrated example is in communication with a main memory including a volatile memory 806 and a non-volatile memory 808 via a bus 810. The volatile memory 806 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 808 may be implemented by flash memory and/or any other desired type of memory device. Access to the main memory 806, 808 is controlled by a memory controller.

The processor platform 800 of the illustrated example also includes an interface circuit 812. The interface circuit 812 may be implemented by any type of interface standard, such as an Ethernet interface, a universal serial bus (USB), a Bluetooth® interface, a near field communication (NFC) interface, and/or a PCI express interface.

In the illustrated example, one or more input devices 814 are connected to the interface circuit 812. The input device(s) 814 permit(s) a user to enter data and/or commands into the processor 802. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 816 are also connected to the interface circuit 812 of the illustrated example. The output devices 816 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 812 of the illustrated example, thus, typically includes a graphics driver card, a graphics driver chip and/or a graphics driver processor.

The interface circuit 812 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 818. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 820 for storing software and/or data. Examples of such mass storage devices 820 include floppy disk drives, hard drive disks, CD drives, Blu-ray disk drives, redundant array of independent disks (RAID) systems, and DVD drives.

Coded instructions 822 including the coded instructions of FIGS. 3, 5 and 7 may be stored in the mass storage device 820, in the volatile memory 806, in the non-volatile memory 808, and/or on a removable non-transitory computer-readable storage medium such as a CD-ROM or a DVD.

From the foregoing, it will be appreciated that example methods, systems, apparatus and articles of manufacture have been disclosed that model eCommerce sales. From the foregoing, it will be appreciated that methods, systems, apparatus and articles of manufacture have been disclosed that enhance the operations of a computer to improve the accuracy and completeness of eCommerce sales estimates. The disclosed methods, systems, apparatus and articles of manufacture improve the efficiency of using a computing device by enabling the use of easily obtained publicly available commerce metrics to estimate eCommerce sales for a much larger number of eCommerce entities. Thereby increasing the completeness and statistical accuracy of eCommerce sales measurement. Thus, the disclosed methods, apparatus and articles of manufacture are accordingly directed to one or more improvement(s) in the functioning of a computer.

Example methods, systems, apparatus and articles of manufacture to model ecommerce sales are disclosed herein. Further examples and combinations thereof include at least the following.

Example 1 is a system to model eCommerce sales, the system including a trend identifier to compute commerce metric differences corresponding to products, the commerce metric differences based on first commerce metrics scraped at a first time and second commerce metrics scraped at a second time, a splitter to split the commerce metric differences into a first portion of the commerce metric differences corresponding to a first dataset of eCommerce cooperators, and into a second portion of the commerce metric differences corresponding to a second dataset of eCommerce non-cooperators, a machine learning engine to infer sales data by estimating eCommerce non-cooperators sales based on the second portion of the commerce metric differences, and a sales allocator to estimate sales missing from collected sales data based on the estimate eCommerce non-cooperators sales.

Example 2 is the system of example 1, wherein the machine learning engine is to train a model using the first portion of the commerce metric differences, and pass the second portion of the commerce metric differences through the model to estimate the eCommerce non-cooperators sales.

Example 3 is the system of example 2, further including a contribution probability index calculator to calculate product contribution probability indices corresponding to the products for (a) the eCommerce cooperators and (b) the eCommerce non-cooperators, the product contribution probability indices based on the model.

Example 4 is the system of example 3, wherein the sales allocator is to estimate the sales missing from collected sales data based on the eCommerce non-cooperators and product contribution probability indices.

Example 5 is the system of example 1, further including a natural language processor to form a first set of consumer sentiments from the first commerce metrics, and form a second set of consumer sentiments from the second commerce metrics, wherein the commerce metric differences include differences between the first set of consumer sentiments and the second set of consumer sentiments.

Example 6 is the system of example 1, wherein the first commerce metrics include first traffic metrics, and the second commerce metrics include second traffic metrics, wherein the commerce metric differences include differences between the first traffic metrics and the second traffic metrics.

Example 7 is the system of example 6, wherein the first traffic metrics are based on a number of feedback instances and a number of comments.

Example 8 is the system of example 1, wherein the first commerce metrics include first ratings metrics, and the second commerce metrics include second ratings metrics, wherein the commerce metric differences include differences between the first ratings metrics and the second ratings metrics.

Example 9 is the system of example 1, further including a panel gap analyzer to identify a statistical gap in a panel composition for a product by computing a difference of a first ratio of a first number of sales of the product to a panel and a second number of sales of all products to the panel, and a second ratio of a third number of sales of the product recorded by eCommerce cooperators and a fourth number of sales of all products to the eCommerce cooperators.

Example 10 is the system of example 9, wherein the statistical gap is a first statistical gap in the panel composition for a first product, and the panel gap analyzer is to identify a second statistical gap in the panel composition for a second product, and combine the first statistical gap and the second statistical gap to identify a third statistical gap in the panel composition related to at least one of a strata, or a consumer class.

Example 11 is a system to model eCommerce sales, the system including means for determining trends to compute commerce metric differences corresponding to products, the commerce metric differences based on first commerce metrics scraped at a first time and second commerce metrics scraped at a second time, means for splitting to split the commerce metric differences into a first portion of the commerce metric differences corresponding to a first dataset of eCommerce cooperators, and into a second portion of the commerce metric differences corresponding to a second dataset of eCommerce non-cooperators, means for predicting to infer sales data by estimating eCommerce non-cooperators sales based on the second portion of the commerce metric differences, and means for allocating sales to allocate missing from collected sales data based on the estimate eCommerce non-cooperators sales.

Example 12 is system of example 11, further including means for determining product ratios to calculate product contribution probability indices corresponding to the products for (a) the eCommerce cooperators and (b) the eCommerce non-cooperators, the product contribution probability indices based on a sales prediction model.

Example 13 is system of example 12, wherein the allocating sales means is to estimate the sales missing from collected sales data based on the eCommerce non-cooperators and the product contribution probability indices.

Example 14 is system of example 11, further including means for language processing to form a first set of consumer sentiments from the first commerce metrics, and form a second set of consumer sentiments from the second commerce metrics, wherein the commerce metric differences include differences between the first set of consumer sentiments and the second set of consumer sentiments.

Example 15 is system of example 11, wherein the first commerce metrics include first traffic metrics, the second commerce metrics include second traffic metrics, and the commerce metric differences include differences between the first traffic metrics and the second traffic metrics.

Example 16 is system of example 15, wherein the first traffic metrics are based on a number of feedback instances and a number of comments.

Example 17 is system of example 11, wherein the first commerce metrics include first ratings metrics, and the second commerce metrics include second ratings metrics, wherein the commerce metric differences include differences between the first ratings metrics and the second ratings metrics.

Example 18 is system of example 11, further including means for determining gaps to identify a statistical gap in a panel composition for a product by computing a difference of a first ratio of a first number of sales of the product to a panel and a second number of sales of all products to the panel, and a second ratio of a third number of sales of the product recorded by eCommerce cooperators and a fourth number of sales of all products to the eCommerce cooperators.

Example 19 is system of example 18, wherein the statistical gap is a first statistical gap in the panel composition for a first product, and the determining gaps means is to identify a second statistical gap in the panel composition for a second product, and combine the first statistical gap and the second statistical gap to identify a third statistical gap in the panel composition related to at least one of a strata, or a consumer class.

Example 20 is a non-transitory computer-readable storage medium including instructions that, when executed, cause a machine to calculate commerce metric differences corresponding to products, the commerce metric differences based on first commerce metrics scraped at a first time and second commerce metrics scraped at a second time, split the commerce metric differences into a first portion of the commerce metric differences corresponding to a first dataset of eCommerce cooperators, and into a second portion of the commerce metric differences corresponding to a second dataset of eCommerce non-cooperators, estimate eCommerce non-cooperators sales based on the second portion of the commerce metric differences to infer sales data, and estimate sales missing from collected sales data based on the estimate eCommerce non-cooperators sales.

Example 21 is the non-transitory computer-readable storage medium of example 20, wherein the instructions, when executed, cause the machine to estimate the eCommerce non-cooperators sales based on the second portion of the commerce metric differences by training a model using the first portion of the commerce metric differences, and passing the second portion of the commerce metric differences through the model to estimate the eCommerce non-cooperators sales.

Example 22 is the non-transitory computer-readable storage medium of example 21, wherein the instructions, when executed, cause the machine to calculate product contribution probability indices corresponding to the products for (a) the eCommerce cooperators and (b) the eCommerce non-cooperators, the product contribution probability indices based on the model.

Example 23 is the non-transitory computer-readable storage medium of example 22, wherein the instructions, when executed, cause the machine to estimate the sales missing from collected sales data based on the eCommerce non-cooperators and the product contribution probability indices.

Example 24 is the non-transitory computer-readable storage medium of example 20, wherein the instructions, when executed, cause the machine to apply natural language processing to the first commerce metrics to form a first set of consumer sentiments, and apply the natural language processing to the second commerce metrics to form a second set of consumer sentiments, wherein the commerce metric differences include differences between the first set of consumer sentiments and the second set of consumer sentiments.

Example 25 is the non-transitory computer-readable storage medium of example 20, wherein the first commerce metrics include first traffic metrics, the second commerce metrics include second traffic metrics, and the instructions, when executed, cause the machine to, wherein the commerce metric differences include differences between the first traffic metrics and the second traffic metrics.

Example 26 is the non-transitory computer-readable storage medium of example 25, wherein the first traffic metrics are based on a number of feedback instances and a number of comments.

Example 27 is the non-transitory computer-readable storage medium of example 20, wherein the instructions, when executed, cause the machine to, wherein the first commerce metrics include first ratings metrics, and the second commerce metrics include second ratings metrics, wherein the commerce metric differences include differences between the first ratings metrics and the second ratings metrics.

Example 28 is the non-transitory computer-readable storage medium of example 20, wherein the instructions, when executed, cause the machine to identify a statistical gap in a panel composition for a product by computing a difference of a first ratio of a first number of sales of the product to a panel and a second number of sales of all products to the panel, and a second ratio of a third number of sales of the product recorded by eCommerce cooperators and a fourth number of sales of all products to the eCommerce cooperators.

Example 29 is a computer-implemented method to model eCommerce sales including calculating, by executing an instruction with at least one processor, commerce metric differences corresponding to products, the commerce metric differences based on first commerce metrics scraped at a first time and second commerce metrics scraped at a second time, splitting, by executing an instruction with the at least one processor, the commerce metric differences into a first portion of the commerce metric differences corresponding to a first dataset of eCommerce cooperators, and into a second portion of the commerce metric differences corresponding to a second dataset of eCommerce non-cooperators, estimating infer sales data by estimating, by executing an instruction with the at least one processor, eCommerce non-cooperators sales based on the second portion of the commerce metric differences, and estimating, by executing an instruction with the at least one processor, sales missing from collected sales data based on the estimated eCommerce non-cooperators sales.

Example 30 is the computer-implemented method of example 29, wherein the estimating the eCommerce non-cooperators sales based on the second portion of the commerce metric differences includes training a model using the first portion of the commerce metric differences, and passing the second portion of the commerce metric differences through the model to estimate the eCommerce non-cooperators sales.

Example 31 is the computer-implemented method of example 30, further including calculating product contribution probability indices corresponding to the products for (a) the eCommerce cooperators and (b) the eCommerce non-cooperators, the product contribution probability indices based on the model.

Example 32 is the computer-implemented method of example 31, further including calculating wherein the estimating the sales missing from collected sales data based on the eCommerce non-cooperators and the product contribution probability indices.

Example 33 is the computer-implemented method of example 29, further including applying natural language processing to the first commerce metrics to form a first set of consumer sentiments, and applying the natural language processing to the second commerce metrics to form a second set of consumer sentiments, wherein the commerce metric differences include differences between the first set of consumer sentiments and the second set of consumer sentiments.

Example 34 is the computer-implemented method of example 29, wherein the first commerce metrics include first traffic metrics, and the second commerce metrics include second traffic metrics, wherein the commerce metric differences include differences between the first traffic metrics and the second traffic metrics.

Example 35 is the computer-implemented method of example 34, wherein the first traffic metrics are based on a number of feedback instances and a number of comments.

Example 36 is the computer-implemented method of example 29, wherein the first commerce metrics include first ratings metrics, and the second commerce metrics include second ratings metrics, wherein the commerce metric differences include differences between the first ratings metrics and the second ratings metrics.

Example 37 is the computer-implemented method of example 29, further including identifying a statistical gap in a panel composition for a product by computing a difference of a first ratio of a first number of sales of the product to a panel and a second number of sales of all products to the panel, and a second ratio of a third number of sales of the product recorded by eCommerce cooperators and a fourth number of sales of all products to the eCommerce cooperators.

Example 38 is the computer-implemented method of example 37, wherein the statistical gap is a first statistical gap in the panel composition for a first product, and further including identifying a second statistical gap in the panel composition for a second product, and combining the first statistical gap and the second statistical gap to identify a third statistical gap in the panel composition related to at least one of a strata, or a consumer class.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or c refers to any combination or subset of A, B, c such as (1) A alone, (2) B alone, (3) c alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

It is noted that this patent claims the benefit of U.S. Provisional Patent Application Ser. No. 62/754,368, entitled "Methods, Systems, Apparatus and Articles of Manufacture to Improve eCommerce Estimation Modeling," which was filed on Nov. 1, 2018, and is hereby incorporated by reference in its entirety.

Any references, including publications, patent applications, and patents cited herein are hereby incorporated in their entirety by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system to model eCommerce sales, the system comprising:
   trend identifier circuitry to compute trend data, the trend data to include commerce metric difference values corresponding to product sales of a plurality of eCommerce entities, the commerce metric difference values based on first commerce metrics scraped at a first time and second commerce metrics scraped at a second time, the first commerce metrics and the second commerce metrics scraped from a plurality of websites corresponding to the plurality of eCommerce entities;
   splitter circuitry to split the commerce metric difference values into (a) a first trend dataset of the commerce metric difference values corresponding to a first dataset of eCommerce cooperators, in which the eCommerce cooperators have provided to the system sales data associated with the products, and (b) a second trend dataset of the commerce metric difference values corresponding to a second dataset of eCommerce non-cooperators, in which eCommerce non-cooperators sales data associated with the products is inaccessible by the system;

machine learning engine circuitry to:
train a model to estimate sales using at least a portion of the first trend dataset;
compare an output of the model to the sales data associated with the eCommerce cooperators to update the model; and
pass the second trend dataset through the model to estimate the eCommerce non-cooperators sales corresponding to the products; and sales allocator circuitry to estimate sales missing from collected panel sales data, the estimate of missing panel sales based on the estimated eCommerce non-cooperators sales.

2. The system of claim 1, further including a contribution probability index calculator circuitry to calculate product contribution probability indices corresponding to the products for (a) the eCommerce cooperators and (b) the eCommerce non-cooperators, the product contribution probability indices at least partially based on outputs of the model.

3. The system of claim 2, wherein the sales allocator circuitry is to estimate the sales missing from the collected panel sales data at least partially based on the eCommerce non-cooperators and the product contribution probability indices.

4. The system of claim 1, further including natural language processor circuitry to:
form a first set of consumer sentiments from first consumer comments about the products, the first commerce metrics including the first consumer comments; and
form a second set of consumer sentiments from second consumer comments about the products, the second commerce metrics including the second consumer comments, the commerce metric difference values including differences between the first set of consumer sentiments and the second set of consumer sentiments.

5. The system of claim 1, wherein the first commerce metrics include first ratings metrics for the products and first traffic metrics for the products, the second commerce metrics include second ratings metrics for the products and second traffic metrics for the products, and the commerce metric difference values include (a) differences between the first ratings metrics and the second ratings metrics, and (b) differences between the first traffic metrics and the second traffic metrics.

6. The system of claim 5, wherein the first traffic metrics are based on a number of first consumer feedback instances for the products summed with a number of first consumer comments about the products, and wherein the second traffic metrics are based on a number of second consumer feedback instances for the products summed with a number of second consumer comments about the products.

7. The system of claim 1, further including panel gap analyzer circuitry to identify a statistical gap in a panel composition for a first one of the products by computing a difference of a first ratio of a first number of sales of the first one of the products to a panel and a second number of sales of all of the products to the panel, and a second ratio of a third number of sales of the first one of the products recorded by eCommerce cooperators and a fourth number of sales of all of the products to the eCommerce cooperators.

8. The system of claim 7, wherein the statistical gap is a first statistical gap in the panel composition for the first one of the products, and the panel gap analyzer circuitry is to:
identify a second statistical gap in the panel composition for a second one of the products; and
combine the first statistical gap and the second statistical gap to identify a third statistical gap in the panel composition related to at least one of a strata, or a consumer class.

9. A system to model eCommerce sales, the system comprising:
means for determining trends to compute commerce metric difference value trend data corresponding to product sales of a plurality of eCommerce entities, the commerce metric difference values based on first commerce metrics scraped at a first time and second commerce metrics scraped at a second time, the first commerce metrics and the second commerce metrics scraped from a plurality of websites corresponding to the plurality of eCommerce entities;
means for splitting to split the commerce metric difference value trend data into (a) a first trend dataset of the commerce metric difference value trend data corresponding to a first dataset of eCommerce cooperators, in which the eCommerce cooperators have provided to the system sales data associated with the products, and (b) a second trend dataset of the commerce metric difference value trend data corresponding to a second dataset of eCommerce non-cooperators, in which eCommerce non-cooperators sales data associated with the products is inaccessible by the system;
means for predicting to estimate eCommerce non-cooperators sales corresponding to the products by training a model to estimate sales using at least a portion of the first trend dataset, comparing an output of the model to the sales data associated with the eCommerce cooperators to update the model; and passing the second trend dataset through the model; and
means for allocating sales to estimate sales missing from collected panel sales data, the estimate of missing panel sales based on the estimated eCommerce non-cooperators sales.

10. The system of claim 9, further including means for language processing to:
form a first set of consumer sentiments from first consumer comments about the products, the first commerce metrics including the first consumer comments; and
form a second set of consumer sentiments from second consumer comments about the products, the second commerce metrics including the second consumer comments, the commerce metric difference values including differences between the first set of consumer sentiments and the second set of consumer sentiments.

11. The system of claim 9, wherein the first commerce metrics include first ratings metrics for the products and first traffic metrics for the products, the second commerce metrics include second ratings metrics for the products and second traffic metrics for the products, and the commerce metric difference values include (a) differences between the first ratings metrics and the second ratings metrics, and (b) differences between the first traffic metrics and the second traffic metrics.

12. The system of claim 9, further including means for determining gaps to identify a statistical gap in a panel composition for a first one of the products by computing a difference of a first ratio of a first number of sales of the first one of the products to a panel and a second number of sales of all of the products to the panel, and a second ratio of a third number of sales of the first one of the products recorded by eCommerce cooperators and a fourth number of sales of all of the products to the eCommerce cooperators.

13. The system of claim 12, wherein the statistical gap is a first statistical gap in the panel composition for the first one of the products, and the determining gaps means is to:
identify a second statistical gap in the panel composition for a second one of the products; and
combine the first statistical gap and the second statistical gap to identify a third statistical gap in the panel composition related to at least one of a strata, or a consumer class.

14. A non-transitory computer-readable storage medium comprising instructions that, when executed, cause a machine to:
calculate trend data, including commerce metric difference values corresponding to product sales of a plurality of eCommerce entities, the commerce metric difference values based on first commerce metrics scraped at a first time and second commerce metrics scraped at a second time, the first commerce metrics and the second commerce metrics scraped from a plurality of websites corresponding to the plurality of eCommerce entities;
split the commerce metric difference value trend data into (a) a first trend dataset of the commerce metric difference values corresponding to a first dataset of eCommerce cooperators, in which the eCommerce cooperators have provided to the machine to collect sales data associated with the products, and (b) a second trend dataset of the commerce metric difference values corresponding to a second dataset of eCommerce non-cooperators, in which eCommerce non-cooperators sales data associated with the products is inaccessible by the machine;
estimate eCommerce non-cooperators sales corresponding to the products by training a model to estimate male using at least a portion of the first trend dataset, comparing an output of the model to the sales data associated with the eCommerce cooperators to update the model, and running the second trend dataset through the model; and
estimate sales missing from collected panel sales data, the estimate of missing panel sales based on the estimated eCommerce non-cooperators sales.

15. The non-transitory computer-readable storage medium of claim 14, wherein the instructions, when executed, cause the machine to:
apply natural language processing to first consumer comments about the products to form a first set of consumer sentiments, the first commerce metrics including the first consumer comments; and
apply the natural language processing to second consumer comments about the products to form a second set of consumer sentiments, the second commerce metrics including the second consumer comments, the commerce metric difference values including differences between the first set of consumer sentiments and the second set of consumer sentiments.

16. The non-transitory computer-readable storage medium of claim 14, wherein the first commerce metrics include first ratings metrics for the products and first traffic metrics for the products, the second commerce metrics include second ratings metrics for the products and second traffic metrics for the products, and the commerce metric difference values include (a) differences between the first ratings metrics and the second ratings metrics, and (b) differences between the first traffic metrics and the second traffic metrics.

17. The system of claim 11, wherein the first traffic metrics are based on a number of first consumer feedback instances for the products summed with a number of first consumer comments about the products, and wherein the second traffic metrics are based on a number of second consumer feedback instances for the products summed with a number of second consumer comments about the products.

18. The non-transitory computer-readable storage medium of claim 16, wherein the first traffic metrics are based on a number of first consumer feedback instances for the products summed with a number of first consumer comments about the products, and wherein the second traffic metrics are based on a number of second consumer feedback instances for the products summed with a number of second consumer comments about the products.

19. The system of claim 1, wherein the machine learning circuitry trains the model using a first portion of the first trend dataset, and wherein, prior to passing the second trend dataset through the model, the machine learning circuitry is further to:
run a second portion of the first trend dataset through the model;
compare an output of the model corresponding to the second portion of the first trend dataset to sales data provided to the system by the eCommerce cooperators; and
update coefficients of the model based on the comparison.

20. The system of claim 9, further including means for determining product ratios to calculate product contribution probability indices corresponding to the products for (a) the eCommerce cooperators and (b) the eCommerce non-cooperators, the product contribution probability indices at least partially based on outputs of the model.

21. The system of claim 20, wherein the allocating sales means is to estimate the sales missing from collected panel sales data at least partially based on the eCommerce non-cooperators and the product contribution probability indices.

* * * * *